TIME ELAPSE TELEPHONE SWITCHING SYSTEM

Filed April 23, 1954 17 Sheets-Sheet 1

INVENTORS.
FRANK A. MORRIS
ROBERT B. TROUSDALE
BY T. L. Bowes
ATTORNEY

Dec. 10, 1957 F. A. MORRIS ET AL 2,816,168

TIME ELAPSE TELEPHONE SWITCHING SYSTEM

Filed April 23, 1954 17 Sheets-Sheet 2

INVENTORS.
FRANK A. MORRIS
ROBERT B. TROUSDALE
BY
T. L. Bowes
ATTORNEY

INVENTORS.
FRANK A. MORRIS
ROBERT B. TROUSDALE
BY T. L. Bowes
ATTORNEY

INVENTORS.
FRANK A. MORRIS
ROBERT B. TROUSDALE
BY J. L. Bowers
ATTORNEY

INVENTORS.
FRANK A. MORRIS
ROBERT B. TROUSDALE
BY T. L. Bowes
ATTORNEY

INVENTORS.
FRANK A. MORRIS
ROBERT B. TROUSDALE
BY T. L. Bowes
ATTORNEY

TIME ELAPSE TELEPHONE SWITCHING SYSTEM

Filed April 23, 1954

INVENTORS.
FRANK A. MORRIS
ROBERT B. TROUSDALE
BY T. L. Bowes
ATTORNEY

Dec. 10, 1957 F. A. MORRIS ET AL 2,816,168

TIME ELAPSE TELEPHONE SWITCHING SYSTEM

Filed April 23, 1954 17 Sheets-Sheet 8

INVENTORS.
FRANK A. MORRIS
ROBERT B. TROUSDALE
BY *J. L. Bowes*
ATTORNEY

Dec. 10, 1957 F. A. MORRIS ET AL 2,816,168

TIME ELAPSE TELEPHONE SWITCHING SYSTEM

Filed April 23, 1954 17 Sheets-Sheet 9

INVENTORS.
FRANK A. MORRIS
ROBERT B. TROUSDALE
BY T. L. Bowes
ATTORNEY

TIME ELAPSE TELEPHONE SWITCHING SYSTEM

Filed April 23, 1954 17 Sheets-Sheet 10

INVENTORS.
FRANK A. MORRIS
ROBERT B. TROUSDALE
BY T. L. Bowes
ATTORNEY

TIME ELAPSE TELEPHONE SWITCHING SYSTEM

INVENTORS.
FRANK A. MORRIS
ROBERT B. TROUSDALE
BY T. L. Bowes
ATTORNEY

TIME ELAPSE TELEPHONE SWITCHING SYSTEM

Filed April 23, 1954 17 Sheets-Sheet 12

INVENTORS.
FRANK A. MORRIS
ROBERT B. TROUSDALE
BY J. L. Bowes
ATTORNEY

Dec. 10, 1957 F. A. MORRIS ET AL 2,816,168

TIME ELAPSE TELEPHONE SWITCHING SYSTEM

Filed April 23, 1954 17 Sheets-Sheet 13

*INVENTORS.*
FRANK A. MORRIS
ROBERT B. TROUSDALE
*BY* T. L. Bowes
ATTORNEY

Dec. 10, 1957 F. A. MORRIS ET AL 2,816,168

TIME ELAPSE TELEPHONE SWITCHING SYSTEM

Filed April 23, 1954 17 Sheets-Sheet 14

*INVENTORS.*
FRANK A. MORRIS
ROBERT B. TROUSDALE
*BY* T. L. Bowes
ATTORNEY

INVENTORS.
FRANK A. MORRIS
ROBERT B. TROUSDALE
BY T. L. Bowes
ATTORNEY

Dec. 10, 1957 F. A. MORRIS ET AL 2,816,168

TIME ELAPSE TELEPHONE SWITCHING SYSTEM

Filed April 23, 1954 17 Sheets-Sheet 16

INVENTORS.
FRANK A. MORRIS
ROBERT B. TROUSDALE
BY T. L. Bowes
ATTORNEY

Dec. 10, 1957 F. A. MORRIS ET AL 2,816,168

TIME ELAPSE TELEPHONE SWITCHING SYSTEM

Filed April 23, 1954 17 Sheets-Sheet 17

INVENTORS.
FRANK A. MORRIS
ROBERT B. TROUSDALE
BY T. L. Bowes
ATTORNEY 2,816,168

TIME ELAPSE TELEPHONE SWITCHING SYSTEM

Frank A. Morris, Rochester, and Robert B. Trousdale, Webster, N. Y., assignors, by mesne assignments, to General Dynamics Corporation, a corporation of Delaware Application April 23, 1954, Serial No. 425,094

14 Claims. (Cl. 179—15)

This invention relates to telephone systems and more particularly to electronic switching means for use in automatic telephone systems.

It is an object of this invention to provide a new and improved telephone system in which some or substantially all mechanical relays or step-by-step switches are eliminated at a reasonable cost and which is efficient and positive in operation, inexpensive to maintain, and relatively simple to install and maintain.

It is another object of this invention to provide a new and improved finding means of an electronic type operating on pulse multiplex principles and having provision for allotting each finder to a calling line, for rendering each seized finder circuit inoperative to calls on any except that particular calling line, and for preventing loss of a seized finder during dialing or because of the accidental or temporary loss of signal pulses, as for example, hook switch fumbling, slow dialing, etc.

The automatic telephone system described and claimed herein utilizes a finder the operation of which is based upon a principle which may be termed, for convenience, the "Time elapse" principle and utilizes pulse transmission, the pulses representing the various calling lines being multiplexed or intermixed.

In carrying out the principles of this invention, pulse transmission is based upon the utilization of pulses to take spaced samples of the desired signal or intelligence to be conveyed. The effect is the same as plotting a smooth continuous curve from a few points by assuming that a uniform change takes place between them. If more detail is required, more samples or points are taken.

A simple sine wave may be reconstructed, both as to frequency and amplitude, by employing only two samples per cycle. From the Fourier theorem that any complex wave can be synthesized by properly combining sine waves, it is evident that speech can be transmitted at a sampling rate suitable for the highest desired harmonic. Practical filter limitations make it desirable to sample at a rate approximately two and one-half times the highest desired frequency. It should be noted that the width of the sample is of very little importance to the reconstruction providing it is no more than one half as wide as a cycle of the highest desired frequency. The pulse carrier bandwidth is determined by the width of the pulse itself, however, for the narrower the pulse, the wider the band. Modulation has no effect upon the bandwidth. A single pulse sample contains information only as to the voltage of the sampled signal at that instant. This information can be impressed in a number of ways such as pulse height, width, or displacement.

Several audio signals may be transmitted over a single channel by merely staggering the positions of pulse samples. The several signals may be separated at the receiving terminal. Bandwidth utilization is comparable to that of conventional frequency displacement (carrier) systems but the overall economy is greater due to the relatively simple equipment needed to combine and separate the several signals. Multiplex equipment is also compact and either of these factors is far more important in a telephone exchange than in toll transmission networks where pulse methods are already applied.

In accordance with the preferred embodiment of this invention, there is provided a gate which may resemble closely an amplifier, employing one or more electron discharge devices, and which may be called for convenience, an in-gate. An allotter is provided for successively enabling or preparing for conduction upon receipt of a signal pulse the various finder in-gates for a predetermined period, as one frame of signal pulses, a frame comprising a time period permitting a pulse corresponding to each line in the group to be multiplexed. The circuits are arranged so that only one in-gate is enabled by the operation of the allotter at any one time whereby each finder is successively available for the duration of one frame.

Each signal pulse corresponding to a seizing line is passed through the finder to succeeding circuits. In addition each passing signal pulse is utilized to close the in-gate immediately after the passage of the pulse to prevent the allotted finder from being affected by the allotter during the remainder of the call, to transmit outgoing lockout pulses to all other finders at the time positions corresponding to the calling line throughout the duration of the call, and to start a frame timer for re-enabling the in-gate amplifier at the expected times of the succeeding pulses corresponding to the calling line.

It should be remembered that the elapsed time between each signal pulse corresponding to a given subscriber's line, regardless of its time position within the frame, is the same and equal to the duration of a frame. The frame timing means is, therefore, arranged to measure off an identical period starting immediately after each desired signal pulse is received and ending just before the next signal pulse representing the same line appears at the in-gate. The frame timer re-opens the gate just in time to pass the next correct signal pulse whereupon the whole process is repeated successively until no more signal pulses are received.

The finder is thereby controlled to accept only signal pulses having the same time positions as the signal pulse which caused the finder to seize the calling line and other finders are rendered incapable of accepting pulses corresponding to the time position of a calling line because of the lockout pulses which paralyze their in-gates at that time position.

It is desired to prevent loss of a finder because of temporary or accidental loss of signal pulses, due to dialing, etc. For this purpose, there is contemplated provision of an auxiliary gate for the purpose of introducing a train of dummy or auxiliary pulses occurring at the same rate as the signal or multiplexer pulses and which have identical time positions as the signal pulses. These auxiliary pulses are utilized to assist in the switching and timing functions referred to above. To prevent loss of a finder by accidental or temporary loss of pulses for any reason, delay means is associated with the auxiliary gate amplifier as, for example, by providing a resistance-capacity network charged by signal pulses, the time constant being sufficiently long so that momentary interruptions do not stop the flow of auxiliary or control pulses into the finder. This feature of the herein described and illustrated system is not our invention but is the sole invention of Frank A. Morris, assigned to the same assignee as our invention and described, illustrated, and claimed in copending application Serial No. 425,093, filed April 23, 1954.

The system to be described is based upon decimal principles. Lines are preferably grouped by tens, and each group of ten lines is provided with a multiplexing circuit, the multiplexing circuit being arranged to sample each line and to combine pulses representing the samples into a single train of pulses. There is provided, for overall control purposes, a suitable source of pulses of a suitable frequency, as for example, 100 kilocycles. The pulses obtained from this source are commutated and employed for sampling each line successively in the multiplexer. The output of the multiplexer, therefore, comprises a succession of frames of pulses, each frame including ten equally spaced pulses corresponding successively to the ten lines of the calling group. Thus, each frame is divided into ten periods, corresponding periods in each frame representing the same line. The pulses may be modulated by an audio or signal voltage representing the sounds or other intelligence to be communicated or by dial impulses.

The activation of a line by a subscriber, as by lifting his receiver, causes pulses to appear at the finders at regular intervals, the exact time positions of the pulses being dependent upon the particular line activated. Speech and dialing signals are conveyed by these pulses by a form of amplitude modulation, the multiplexed pulses being provided at a relatively high repetition rate as, for example, ten kilocycles per second.

Common equipment may be shared by incorporating a plurality of line finders, as four, for example, to constitute a group, within which each finder is connected to all subscribers' lines included in the particular multiplexed group associated with this group of finders.

The primary purpose of each line finder is to pass multiplexed pulses to succeeding equipment. Secondary purposes include the generation of lockout pulses to be transmitted or impressed upon other finders in the group to cause such other finders to ignore the signals representing the calling line which has been sized, as for example, by sending suitable pulses to the other finders to cut off or close their in-gates, i. e., prevent allotter pulses from opening the gates included in the other finders for the duration of the lockout pulses. If the lockout pulses are timed to straddle the time locations of the found or seized line pulses, the lockout pulses do not affect adjacent multiplexed pulses corresponding to other lines in the calling group.

Other objects and advantages of our invention will become apparent as the following description proceeds, and the features of novelty which characterize our invention will be pointed out with particularity in the claims annexed to and forming a part of this specification. For a better understanding of our inventon, reference may be had to the accompanyng drawings in which:

Figure 17:
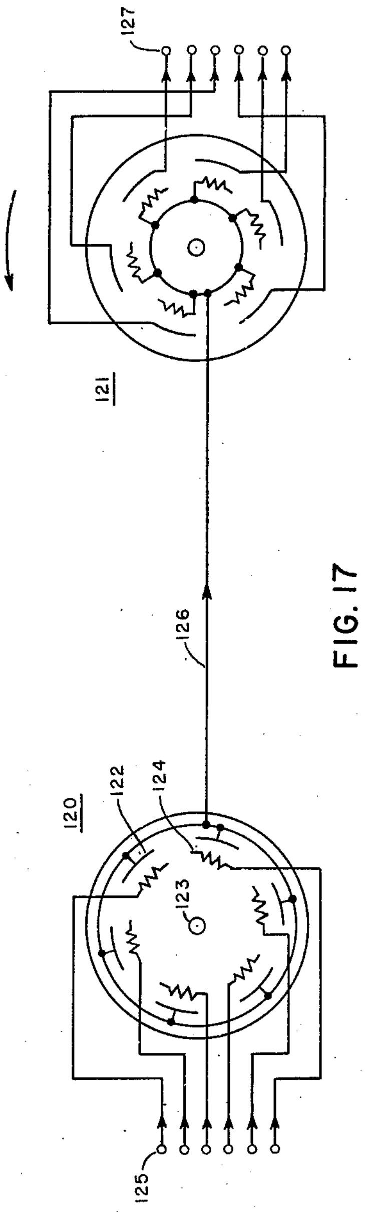
Figures 3, 14:
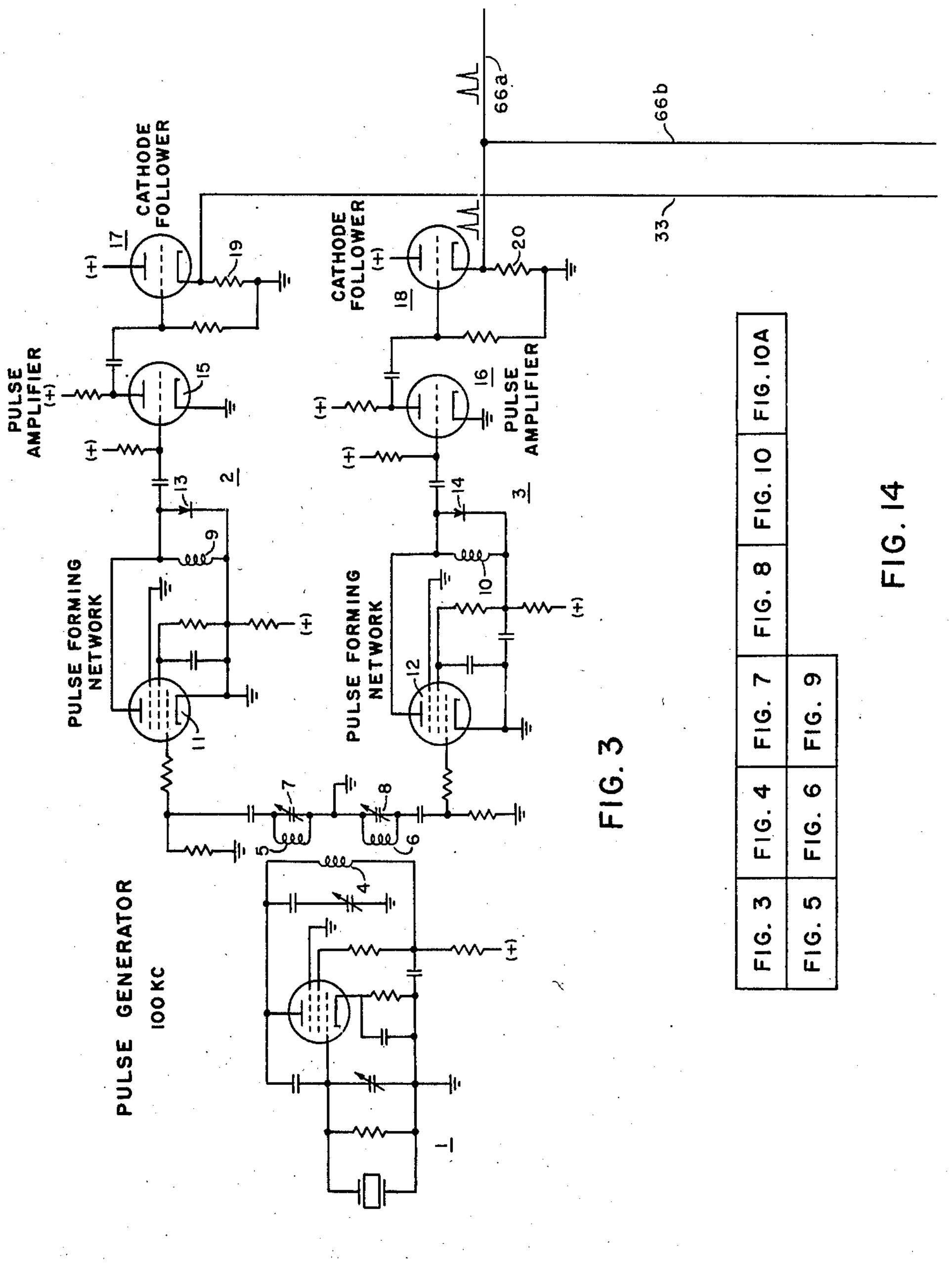
Fig. 3 illustrates a suitable pulse generator for use in our system.
Figure 7:
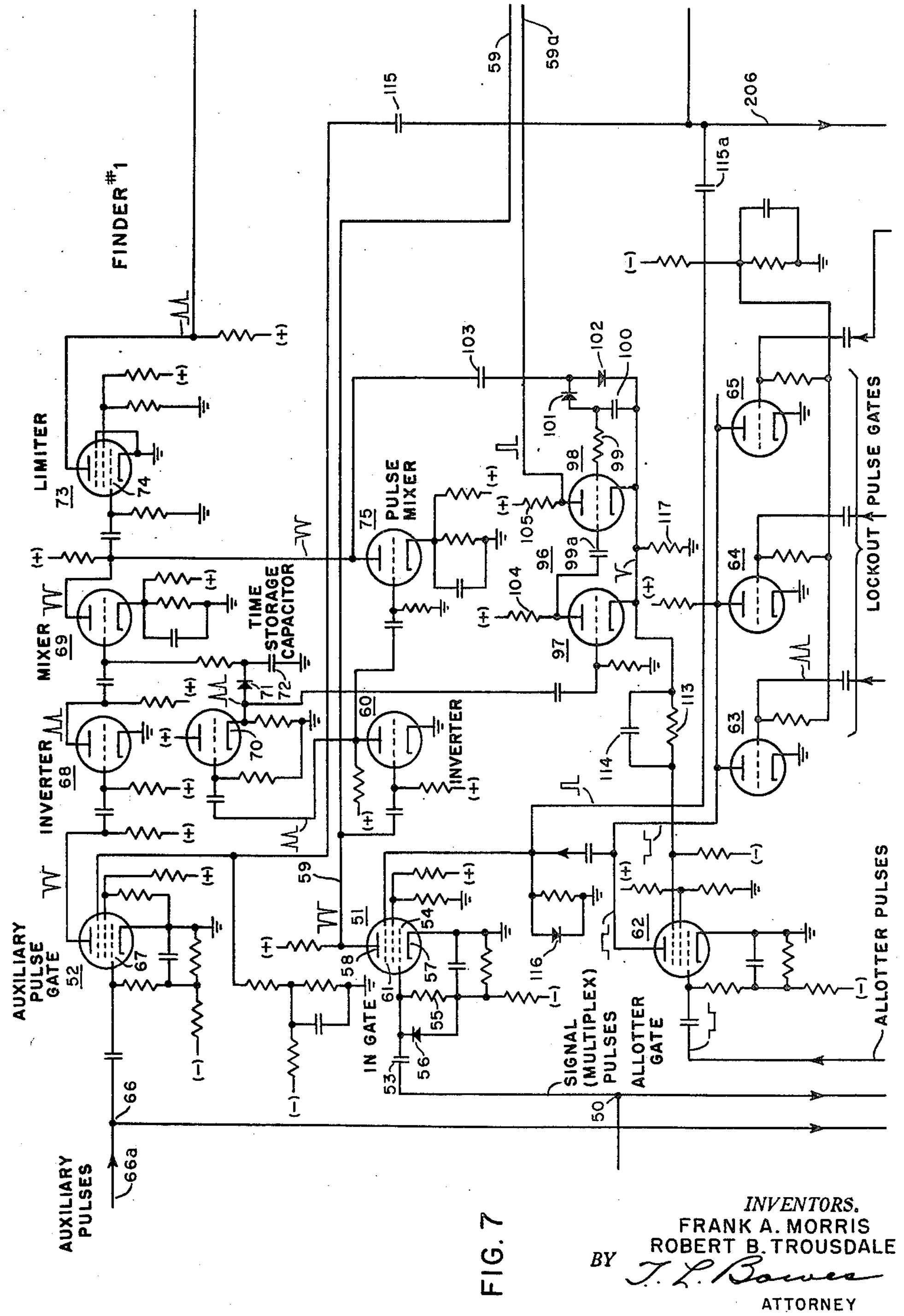
Figure 8:
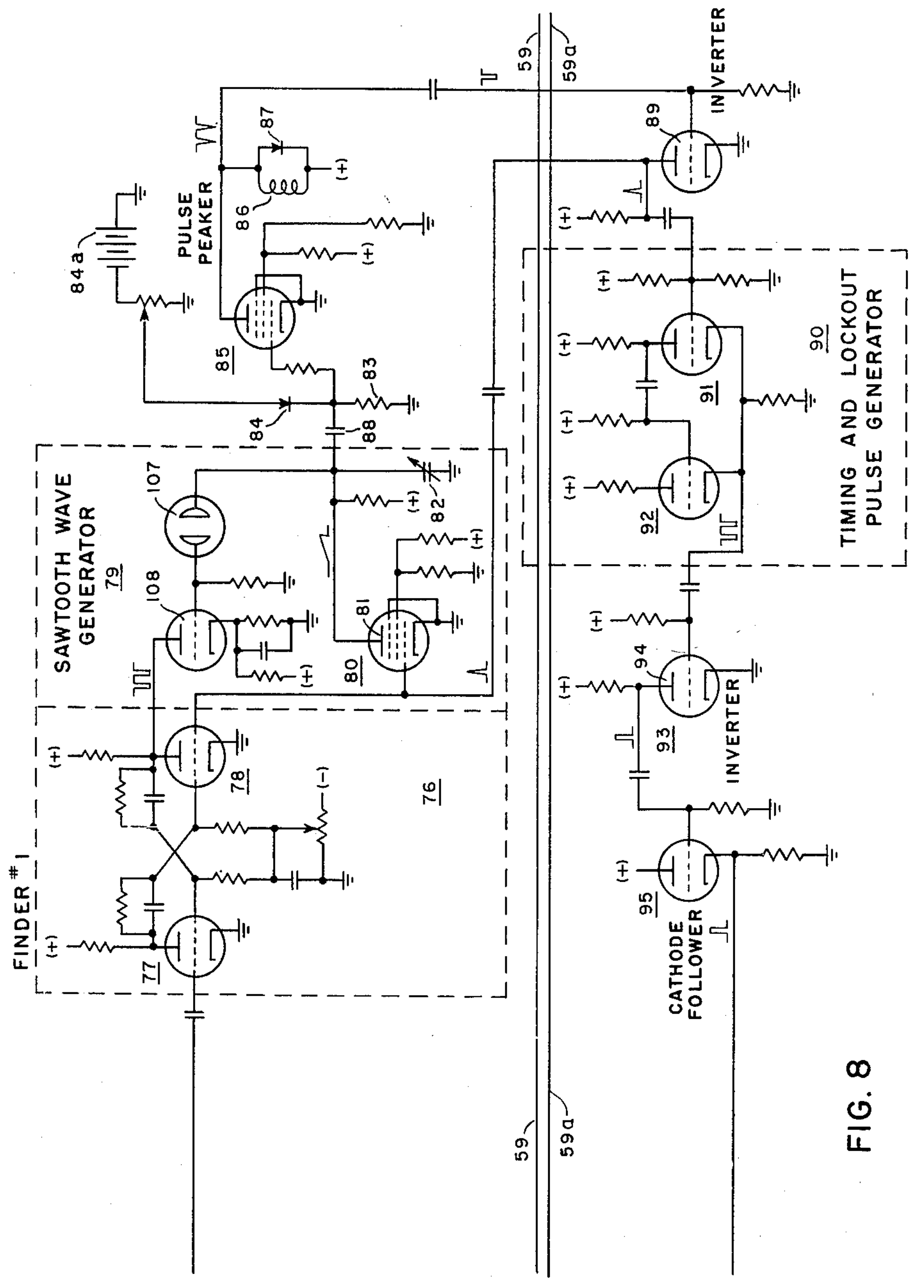
Figure 9:
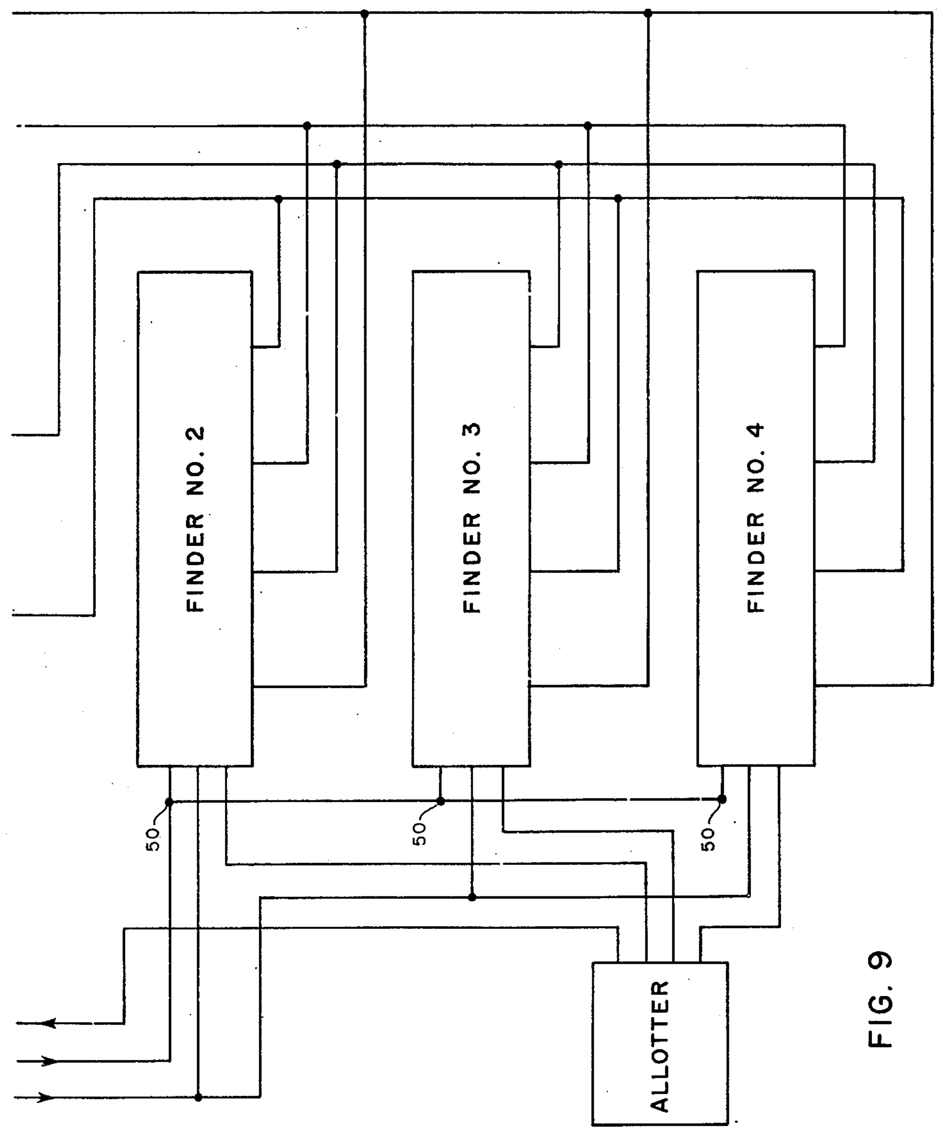
Figure 10:
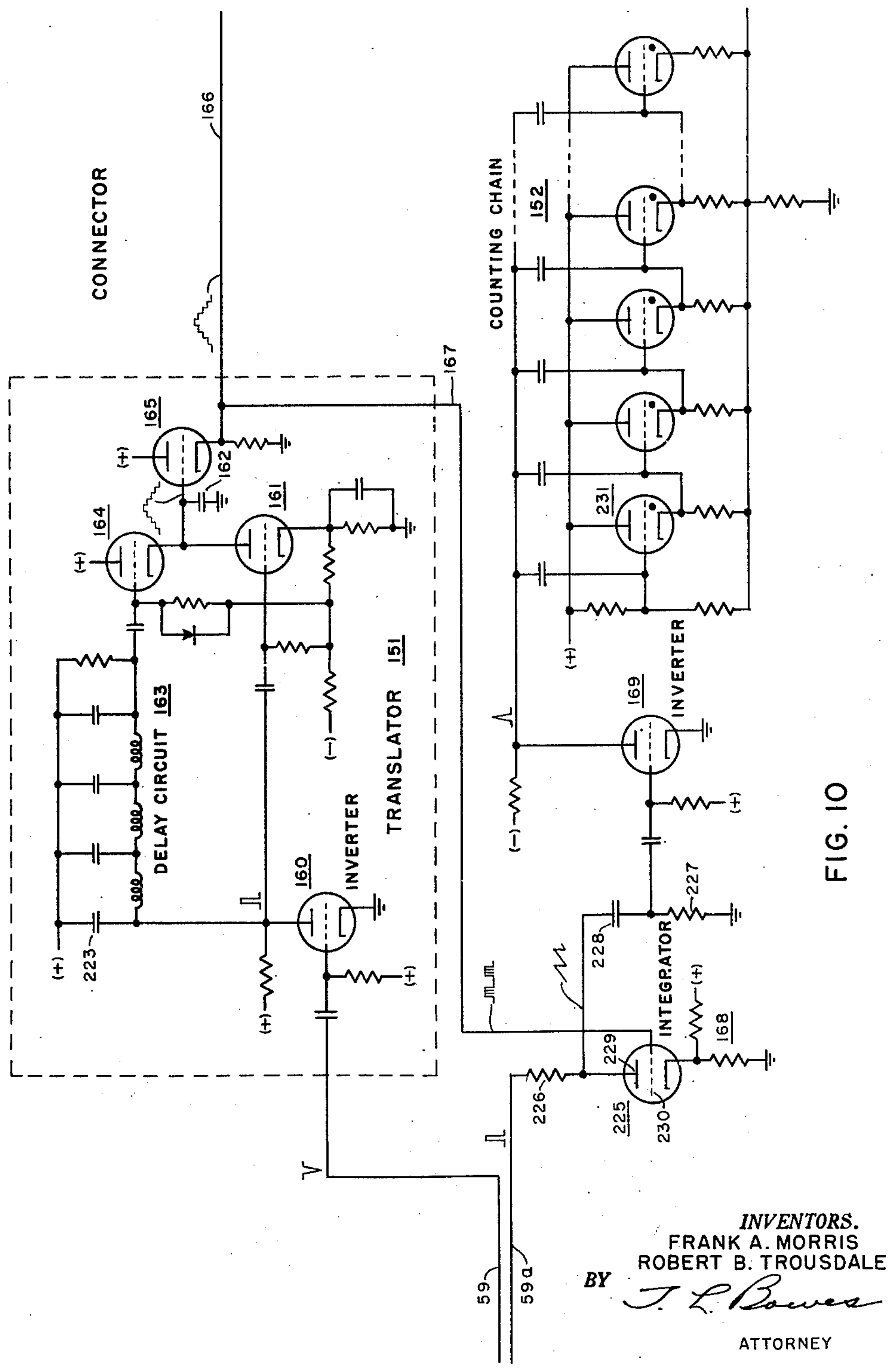
Figure 10A:
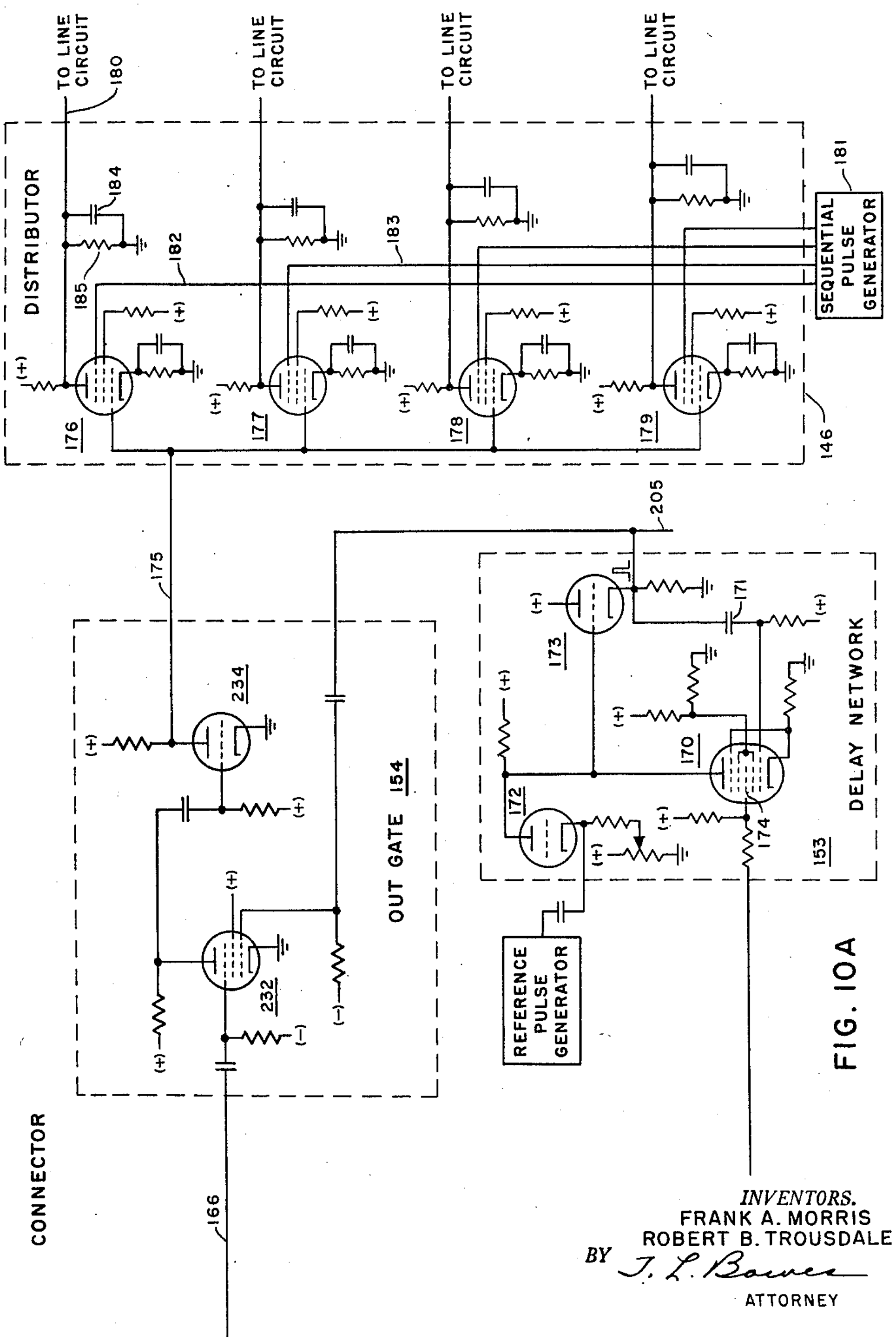
Figure 11:
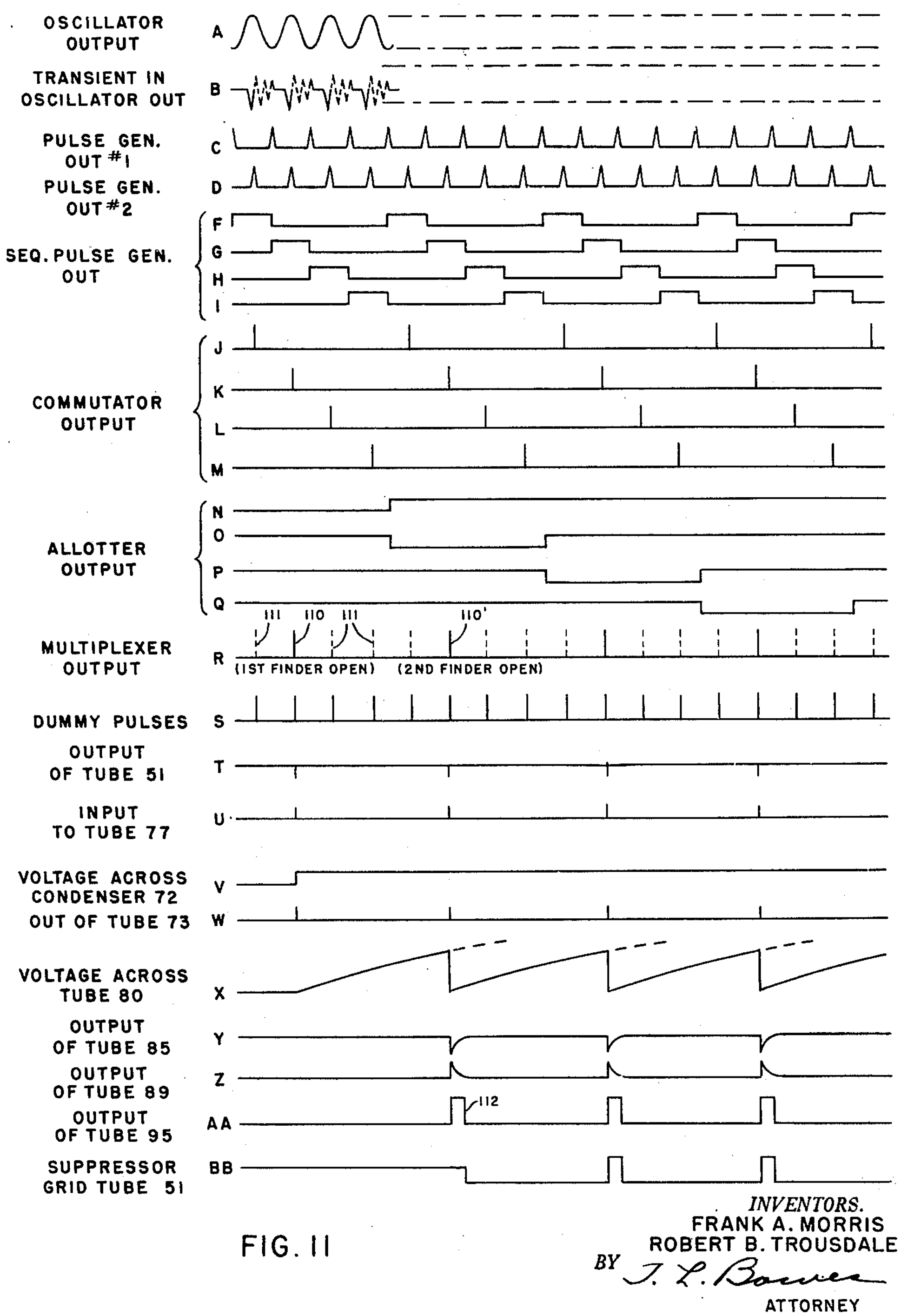
Figure 12:
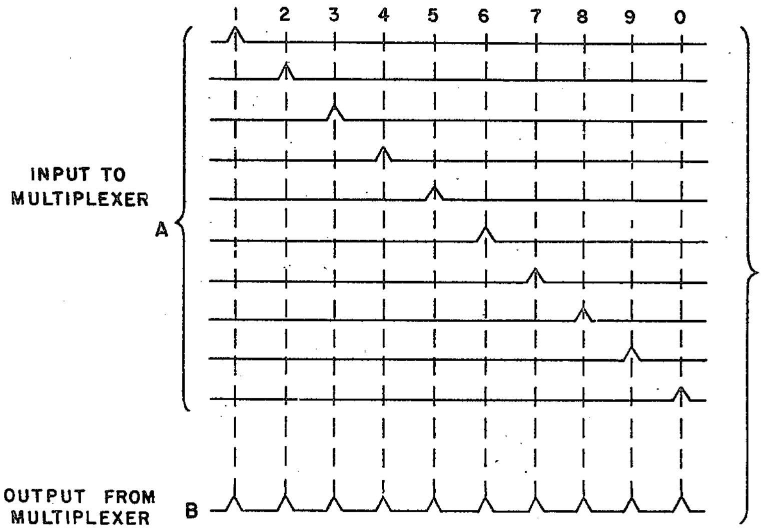
Figure 13:
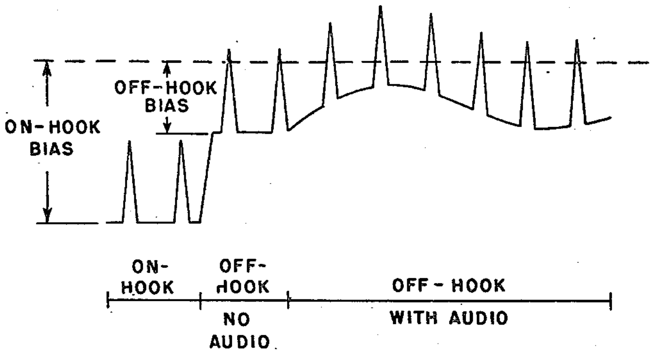
Figure 15:
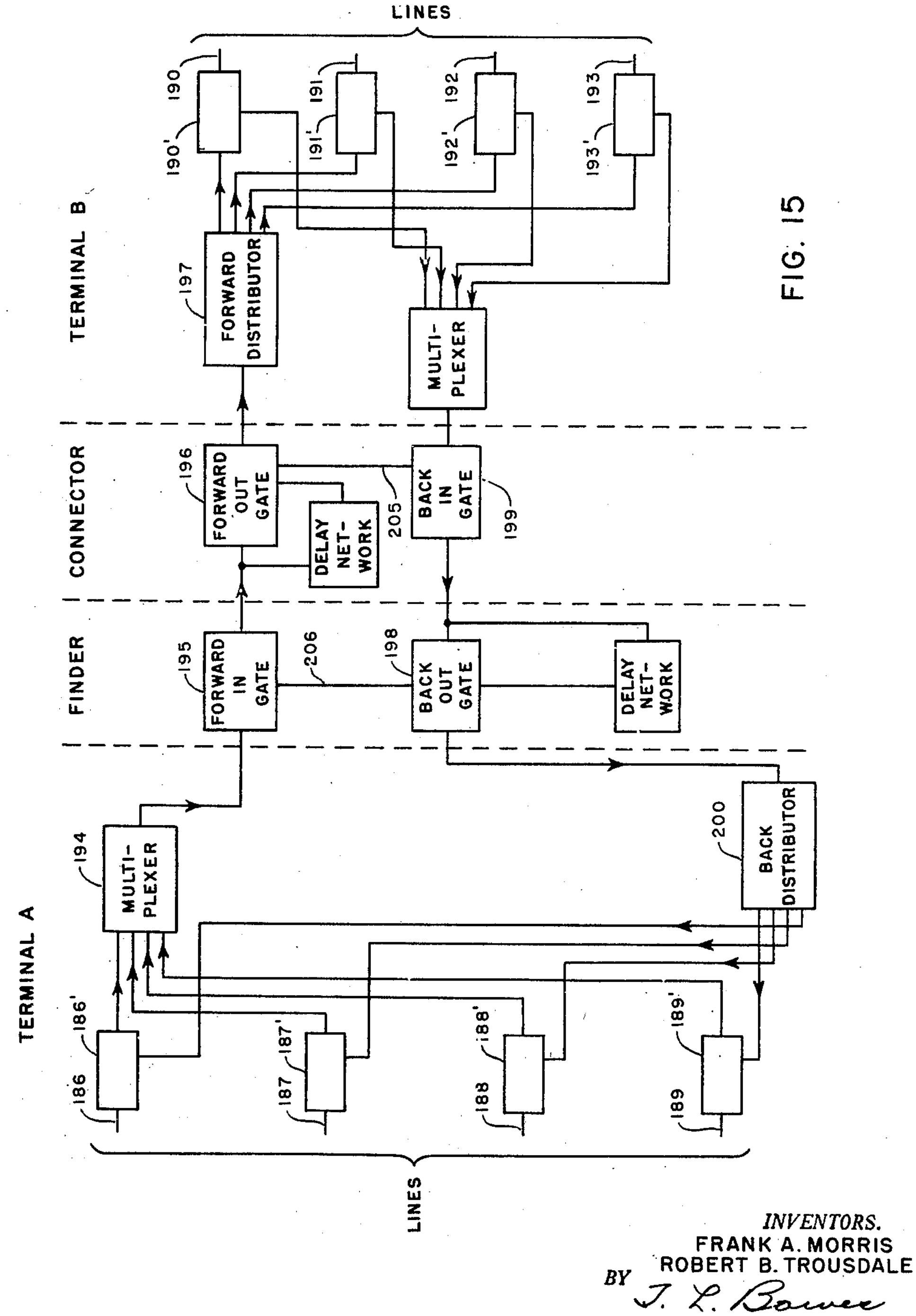
Figure 16:
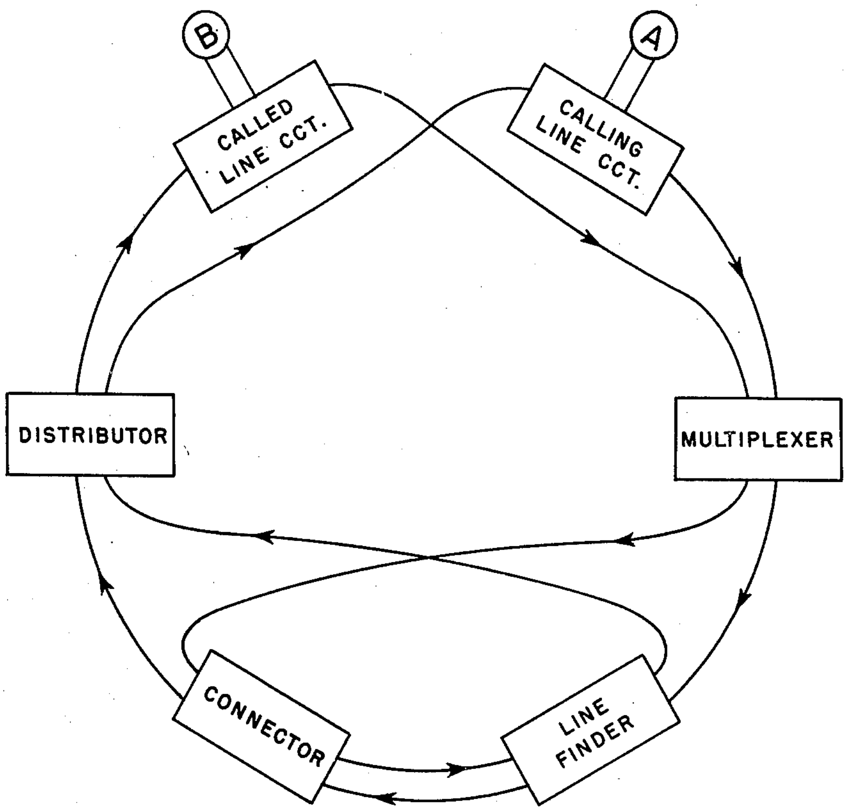
Figure 18:
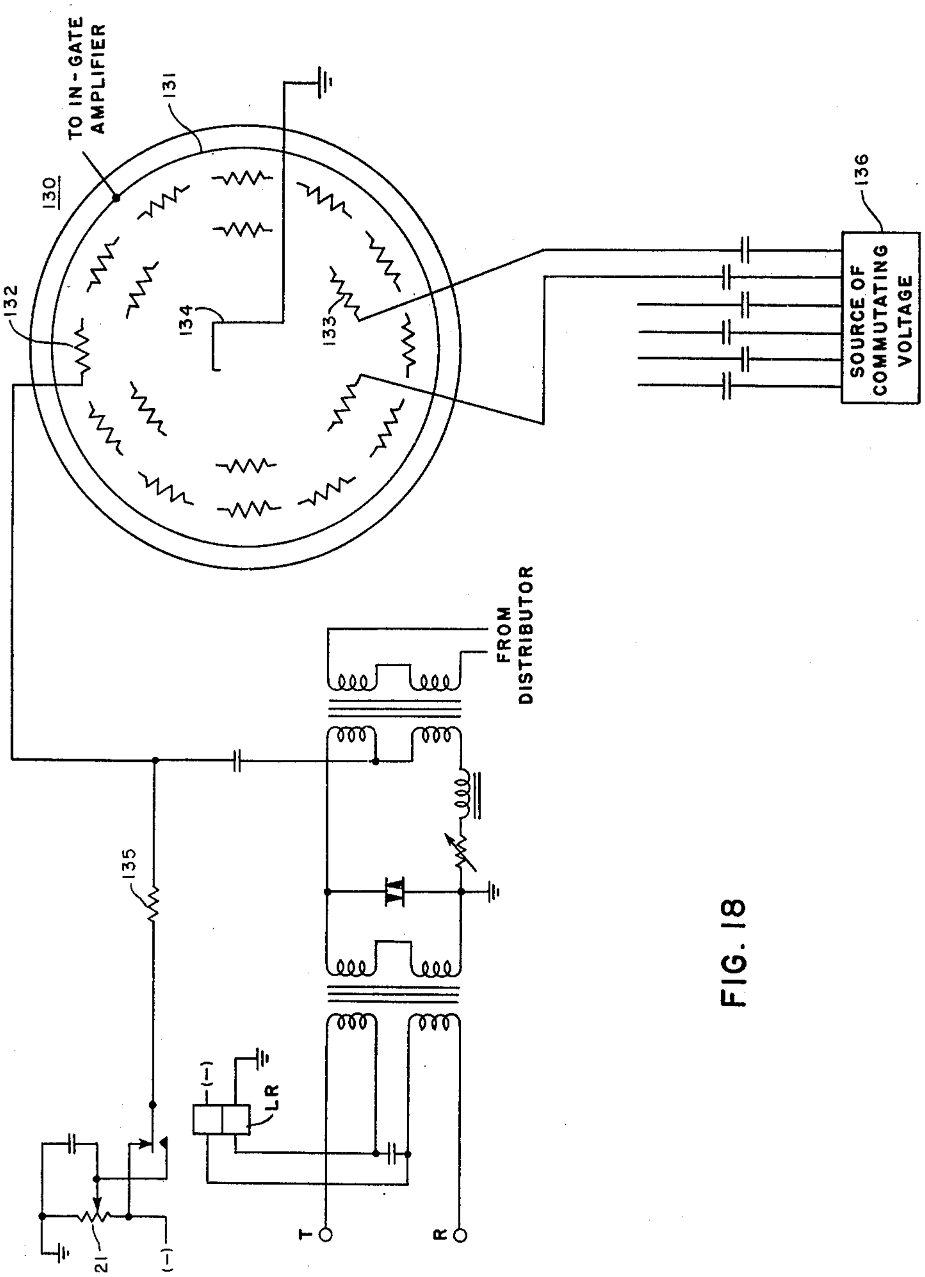
Figures 19, 20:
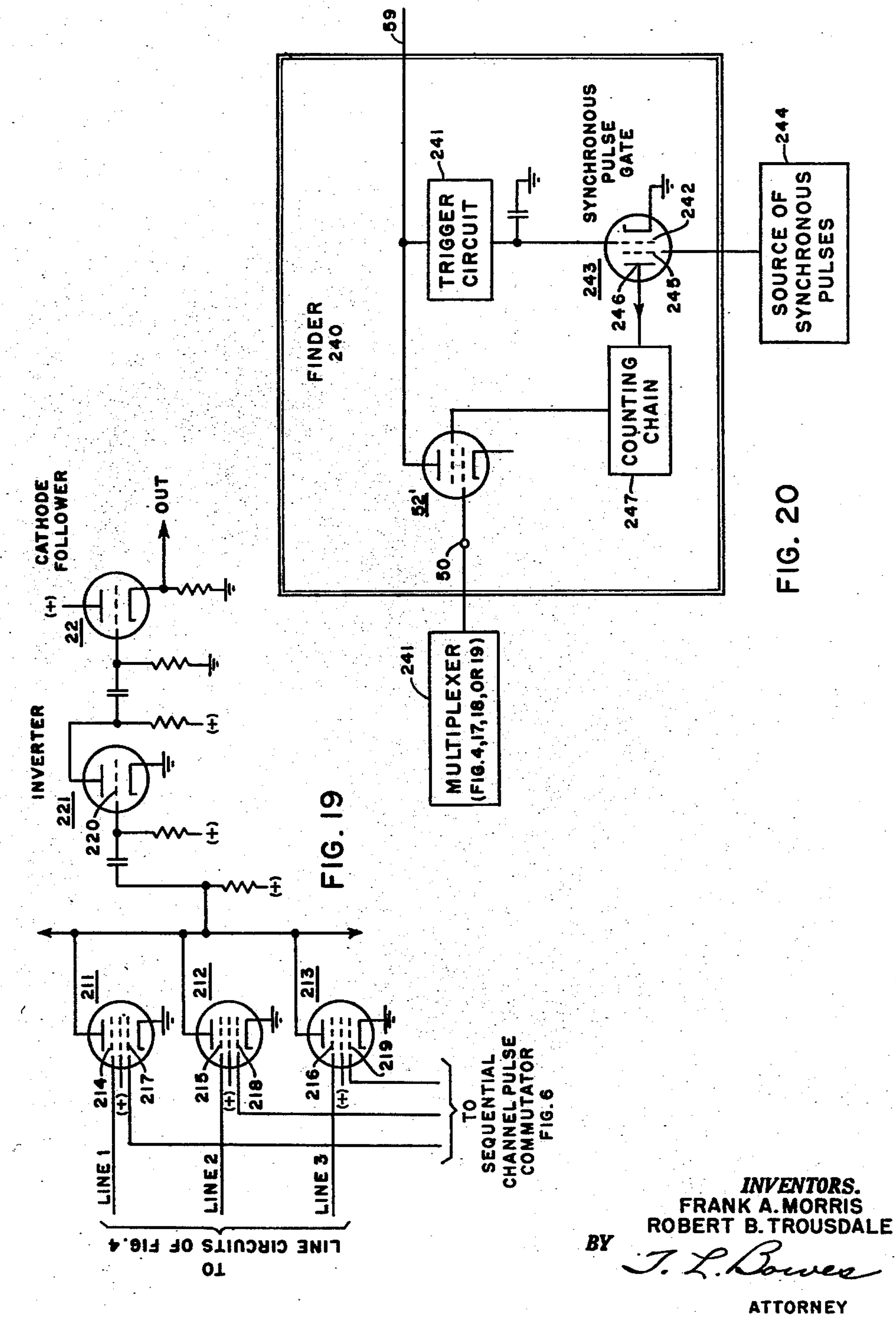

Figs. 7, 8 and 9 when taken together illustrate a finder embodying the principles of our invention;

Fig. 10 discloses a suitable connector for use in the system described herein;

Fig. 10A discloses a suitable out-gate for use in our system;

Figs. 11, 12 and 13 illustrate typical conditions in the system described herein;

Fig. 14 is a chart illustrating the proper relationship of Fig. 3 to 10A, inclusive, these figures when laid next to each other as indicated, illustrating a one-way communication system;

Fig. 15 shows in block form an arrangement utilizing the principles of our invention for providing two-way communication;

Fig. 16 shows a modification of Fig. 15;

Figs. 17, 18 and 19 show alternate forms of multiplexers,

Fig. 20 illustrates a timing circuit which may be employed in my system.

Figure 1:
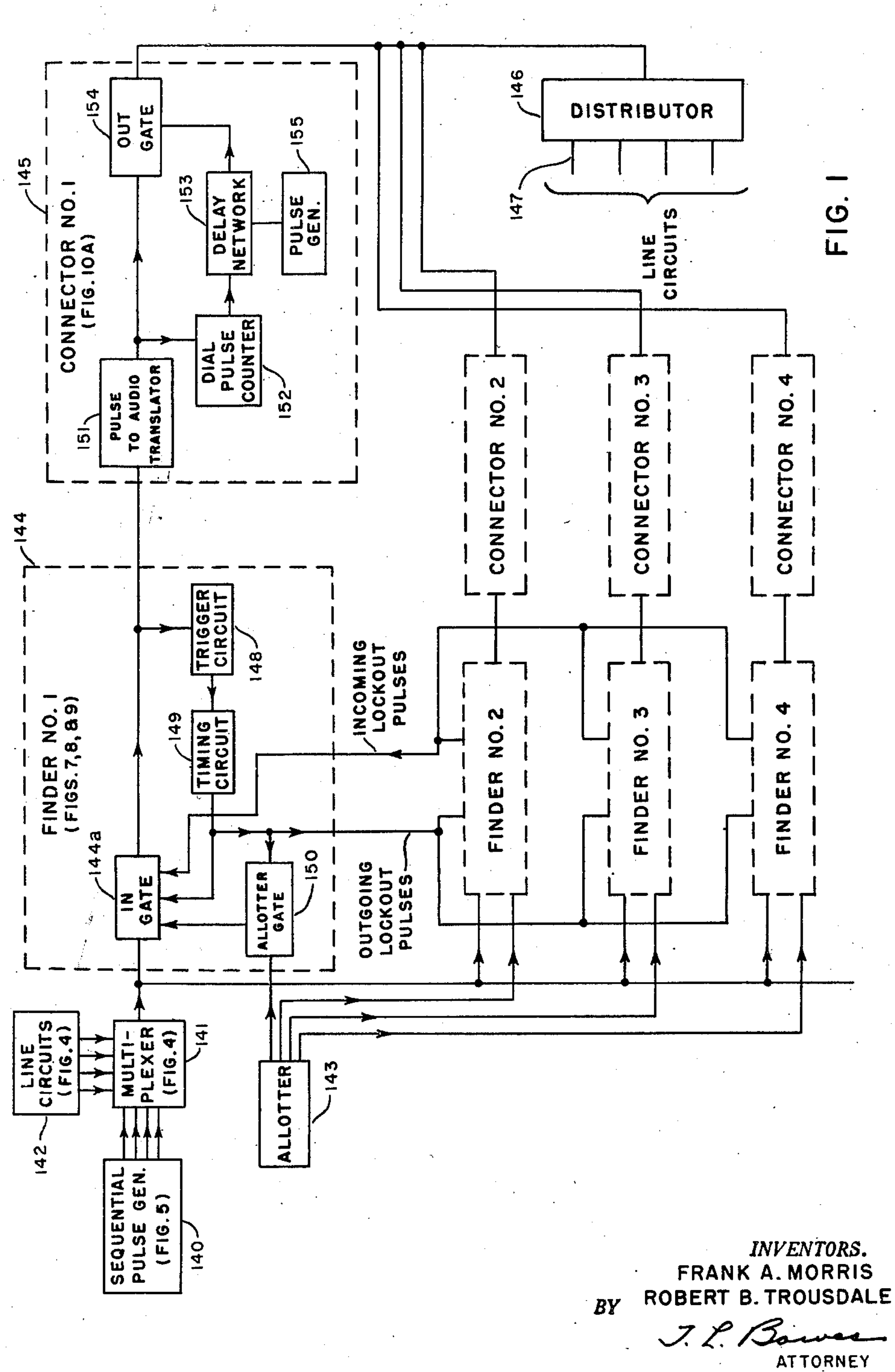
Figs. 1 and 2 show in block diagram form different embodiments of our invention.

In Fig. 1 there are illustrated components of a system, shown in block form, for accomplishing the previously described functions. There is provided a suitable sequential pulse generator 140 for sequentially causing a multiplexing device 141 to sample successively the line circuits 142 assigned to that particular multiplexer. In the output of the multiplexer there appears a train of pulses, each pulse representing a calling line and having a time position within each frame or complete cycle representing a single sampling of each line in the calling group of lines including the calling line. The relationship of input and output pulses wth respect to multiplexer 141 are shown in Fig. 12A and Fig. 12B, respectively. The output from multiplexer 141 comprises, in a single frame, one or more successive pulses depending upon the number of lines in off-hook or calling condition.

For each group of lines there is provided a plurality of finders. We have shown four finders, Finder No. 1 being indicated by the numeral 144.

Each finder is allotted successively for a single frame to test for calling lines, i. e., is made responsive to multiplexer output pulses, by means of suitable signal or control quantities, such as suitable pulses from a suitable allotter 143. Assuming that the allotter has allotted finder 144, in-gate **144*a* is made responsive to pulses received from multiplexer 141. Pulses passing through in-gate 144*a* are forwarded through succeeding equipment such as connector 145, and distributor 146 to the called line, as 147**, for example.

Each finder of the type shown in Fig. 1 is provided with a trigger circuit 148 and a timing circuit 149. Each signal pulse passing through in-gate **144*a* is utilized to block or cut-off in-gate 144*a* immediately after passage of the pulse and to trigger circuit 148 to start a timing cycle arranged to re-open or again enable in-gate 144*a* at such a time as to pass the next pulse corresponding to the seized calling line. Each pulse is also utilized to block and maintain blocked the allotter gate 150** so that Fnder No. 1 cannot be allotted to another call. Pulses are also conducted to the other finders in the finder group to prevent operation of the other finders in response to pulses representing the line seized by Finder No. 1.

Thus, there is provided a finder arranged to accept and pass only signal pulses having the same time position as the pulse which triggered it.

Means is provided for connecting an extended calling line to a called line including a connector 145 and distributor 146. Connector 145 may comprise means to translate the signal pulses into a step representation of the signal being communicated. The translator is generally represented by numeral 151. In order to choose the called line, dial impulse counting means 152 is utilized to trigger a suitable network 153 at a time corresponding to the time position of the called line to open out-gate 154 to resample the audio voltage or signals. Network 153 may be prepared for operation or enabled by means of a reference pulse generator 155 operating in synchronism with pulse generator 140. If desired, generators 140 and 155 may be a single source of pulses. Connector 145 accepts pulses having a time position corresponding to the calling line and forwards or re-transmits pulses in a new time position corresponding to the desired line. The new time position is determined by the network 153 which, in effect, measures off the time between a reference and the time position of the called line which control is determined by dialing at the calling station. The new pulse is released just as the distributor is in condition to pass pulses to the called line. The distributor may comprise a circuit similar to that used in the multiplexer 141.

Figure 2:
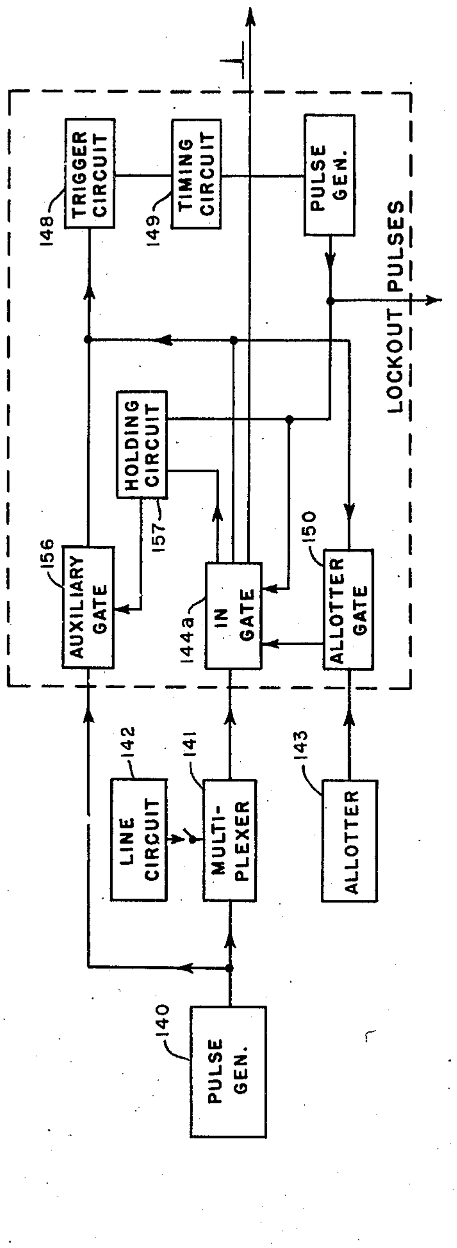

There is illustrated in Fig. 2 a modification, shown and claimed in the above-identified copending application, utilizing auxiliary or dummy control pulses to avoid loss of connections by slow or faulty dialing, flashing, etc. With this arrangement, instead of employing signal pulses to trigger the timing circuit, the signal pulses are utilized to enable or prepare an auxiliary gate 156 for operation upon receipt of auxiliary or control pulses in synchronism with the multiplexed pulses. Separate pulse sources may be used but a single pulse generator 140 as indicated in Fig. 2 is preferable. The auxiliary gate is held open by a suitable slow release or holding circuit 157 such as a resistance-capacity network charged by signal pulses so that momentary or accidental interruptions do not release the finder.

In order to simplify an understanding of this invention, the disclosure has been limited to the essential features of the invention and functions which are not intimately connected with the subject matter claimed herein, such as dial tone, ringing, and busy tone, for example, have been omitted, such features being shown and described in detail in a copending application of Frank A. Morris and Robert B. Trousdale, Serial No. 134,974, filed December 24, 1949, and assigned to the same assignee as the present invention.

*Pulse generator*

In Fig. 3 of the drawings there is illustrated a pulse generator which may be employed as a source of pulses. The generator shown in Fig. 3 comprises a suitable oscillator 1 and two output circuits 2 and 3 coupled to the load side of oscillator 1. Oscillator 1 is illustrated as being of the crystal controlled type, although the degree of stability inherent in this type of oscillator may not be necessary, and in such cases other forms of oscillators may be substituted. The arrangement and operation of oscillators of this nature is so well known that further description is not included in this specification. The circuit elements are preferably so chosen that the oscillator operates at a rate of one hundred kilocycles per second or thereabout.

The output circuits 2 and 3 are coupled to the output or plate circuit of the oscillator 1. For example, the plate or anode circuit of oscillator 1 may include a suitable coil or winding 4 and the inputs to output circuits 2 and 3 may include coils 5 and 6, respectively, shunted by suitable variable capacitors 7 and 8, respectively, to permit tuning of the output circuits 2 and 3 with respect to each other. The windings 5 and 6 are preferably loosely coupled to the coil 4 and the tuning means permits phase shift between the circuits 2 and 3 for a purpose to be explained more fully hereinafter. Each of output circuits 2 and 3 is arranged to convert the sine wave output of oscillator 1 into relatively sharp pulses by including high-Q inductances 9 and 10 as the anode loads of heavily biased electron discharge devices 11 and 12, respectively, in circuits 2 and 3, respectively. Shock excitation of circuits 2 and 3 tends to produce high-frequency transient trains which are cut off at the first reversal by unilateral devices 13 and 14, respectively, which shunt inductances 9 and 10, respectively. Crystal diodes have been found to be suitable for this purpose.

Referring to Fig. 11 of the drawings, there is illustrated at A the output of the oscillator 1 and at B typical transient waves set up in the output circuits, this figure representing the output of circuit 3. By reason of the inclusion of crystal diode 14, the transient curve at Fig. 11B is limited to only one loop as shown in solid lines, the suppressed portion of each of the transients being indicated in Fig. 11B by the dotted extensions of the curves.

The unsuppressed negative pulses are then amplified and inverted in suitable amplifiers 15 and 16, respectively, and delivered at low impedance by cathode followers 17 and 18, respectively. Referring again to Fig. 11, there are represented at C the relatively narrow spaced-apart pulses of positive sense which appear across cathode resistor 19. If the phase shift between circuits 2 and 3 is 180 degrees, the similar relatively narrow spaced-apart pulses of positive sense which appear across cathode resistor 20 of cathode follower stage 18 are as represented at D of Fig. 11.

The output circuits 2 and 3 thus are utilized to produce two sets of relatively sharp pulses which may be displaced with respect to times of occurrence by means of tunable secondary circuits.

Figure 5:
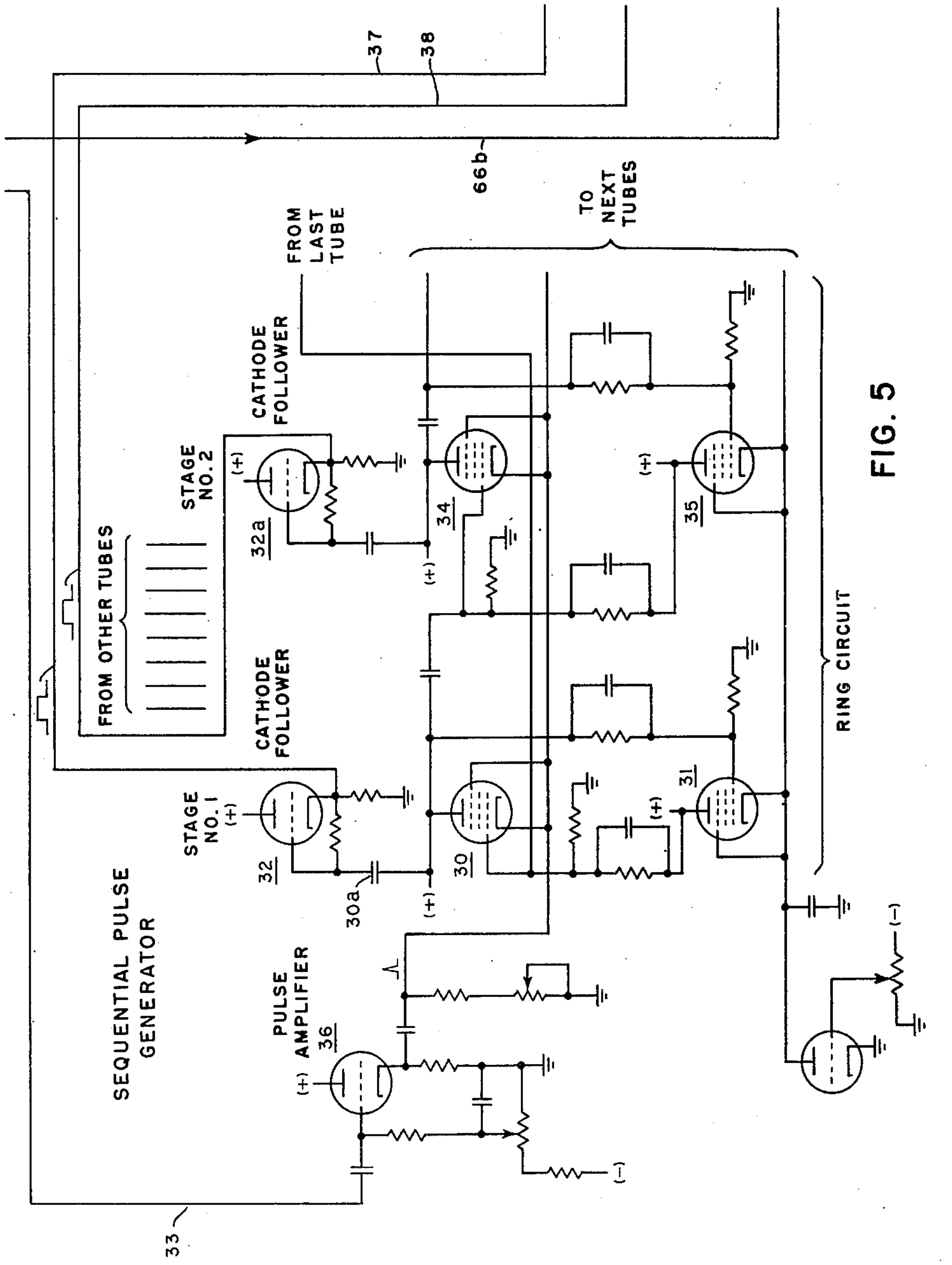
Fig. 5 illustrates the basic features of a suitable sequential generators for use in the telephone system disclosed herein.

One set of the foregoing pulses is used, in the present embodiment of our invention, to excite a sequential pulse generator having one stage for each line in the calling group, two stages of which are shown in Fig. 5. For example, the sequential pulse generator may be a suitable type of ring circuit of which the arrangement shown in Fig. 5 is one form.

The second set of output pulses are fed, in the illustrated form of our invention, to a commutating circuit having an output circuit for each of the calling lines, as ten for example, and also to provide auxiliary or dummy pulses for purposes hereinafter described, as for example to enable or maintain operation of each finder during the temporary or accidental absence of pulses, as during dialing by the calling party, and to perform timing functions.

*Sequential pulse generator*

There is illustrated in Fig. 5 of the drawings a suitable sequential pulse generator for use in carrying out the principles of our invention. As described heretofore, one set of pulses from the pulse generator shown in Fig. 3 is employed to drive or excite the ring circuit constituting the sequential pulse generator in the present embodiment of our invention. It is understood that there is actually employed one stage for each line in the calling group, the output of the last stage being connected to drive the first stage. For convenience, only two stages are shown in the drawing. Each stage comprises an Eccles-Jordan circuit including electron discharge devices, as of the pentode type, represented by the numerals 30, 31 and 34, 35, respectively for the two stages shown. The output of each stage is coupled to a cathode follower including a suitable discharge device, as for example triodes 32 and 32a, respectively, in order to provide output at low impedance. The resulting square wave output pulses may be called gate pulses and are used for commutating the channel pulses and for gating the distributor as more fully described hereinafter.

Referring to each stage of the sequential pulse generator, the components are so disposed that the upper tubes of each stage constitute the "off" section, the anode of which is coupled by a suitable coupling capacitor, as *30a*, to the input side of the associated cathode follower stage. If it is assumed that the upper discharge device 30 of the first stage is conducting, the upper devices of the other stages are non-conducting and remain non-conducting until something occurs to trigger the next upper discharge device 34. When a pulse appears over conductor 33 from the pusle generator, it is amplified by a suitable amplifier 36 and then applied to the cathodes and suppressor electrodes of each upper device. The appearance of a positive pulse on the cathode of device 30 cuts off the discharge device 30. The higher anode potential thereby resulting is impressed upon the control electrode of the lower discharge device 31 in the first stage causing it to become conductive. At the same time, the higher anode voltage of device 30 is impressed upon the control electrode of the upper device 34 of the second stage through a suitable coupling capacitor, causing it to become conductive and pass current.

Inasmuch as the present example embodies 10 lines, it is thus seen that there appear sequentially on the ten output leads from the sequential pulse generator pulses displaced from each other, with respect to time, in ten steps. See Fig. 11, F, G, H and I which represents a four stage output.

The substantially square wave pulses are also conducted to distributor 200 as more fully explained later in this description.

*Channel pulse commutator*

Figure 6:
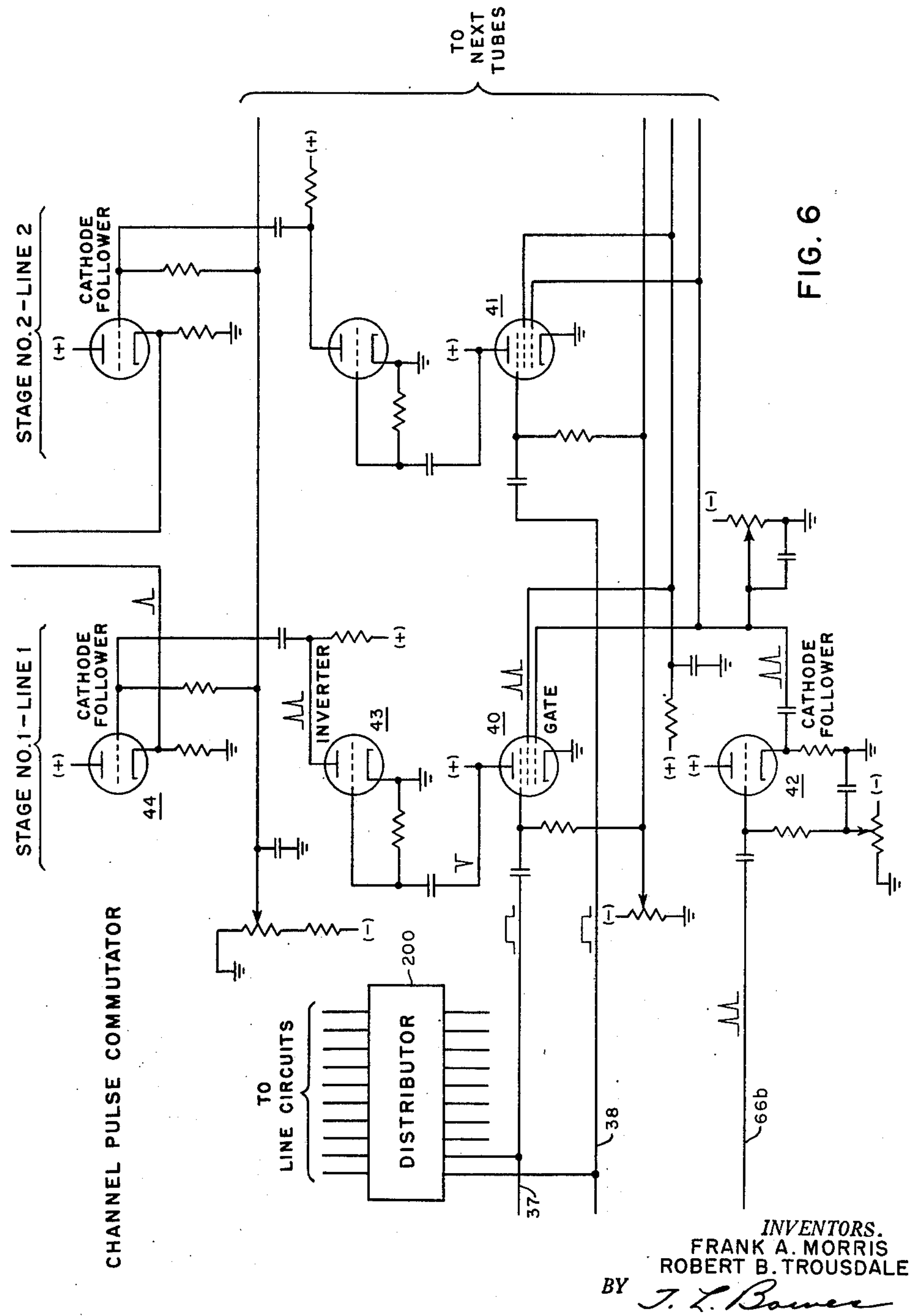
Fig. 6 shows typical circuits for a channel pulse commutator for use with the foregoing components of a system.

The channel pulse commutator of Fig. 6 is utilized to distribute the channel pulses to the ten unidirectionally conductive devices in the multiplexer, i. e., to the ten lines incorporated in the calling group. The commutator comprises a stage for each line, i. e., ten stages, each stage comprising a gating circuit, an inverter circuit, and a cathode follower circuit. For convenience, only two stages are illustrated. The gating tubes are preferably of the pentode type. In the illustrated embodiment of our invention, gate pulses from the stages of sequential pulse generator (Fig. 5) are impressed upon the suppressor grids of the gate tubes 40, 41, etc., by way of conductors 37, 38, etc., as the case may be. The output pulses from the output circuit 3 of the pulse generator are applied as trigger pulses by way of conductors **66*a* and 66*b* to the control electrodes of all gate tubes 40, 41, etc., through a suitable cathode follower stage 42**, the cathode follower output thus being impressed upon all the gate tubes.

By reason of the "on-off" character of each stage of the sequential pulse generator, the gate pulses in the output thereof are substantially square and of relatively long time duration as indicated in Fig. 11, F, G, H and I whereas the control or trigger pulses from circuit 3 of the pulse generator 1 are relatively sharp. The phase displacement between circuits 2 and 3 of pulse generator 1 is preferably such that the sharp control pulses appear at approximately the center of each square input pulse as indicated in Fig. 11D. The gate tubes 40, 41 etc., are preferably biased beyond cut off except when gate and trigger pulses occur at the same time.

The output of each gate tube is inverted in a suitable circuit, as indicated by numeral 43, and after inversion the commutator or channel pulses are passed through suitable cathode follower stages, as indicated by the numeral 44, to provide relatively low impedance output pulses.

Inasmuch as the channel pulses received from the sequential pulse generator occur sequentially, commutation in the commutator or gate tubes takes place sequentially and the effect is to divert successive sharp output channel pulses into the multiplexer to open successively line gates in the multiplexer (Fig. 4) whereby the audio or signal potential present on the line associated with the open multiplexer gate is sampled, as explained previously.

Pulses shown at J, K, L and M on Fig. 11, and those shown on Fig. 12A represent typical commutator output pulses.

*Multiplexer*

Figure 4:
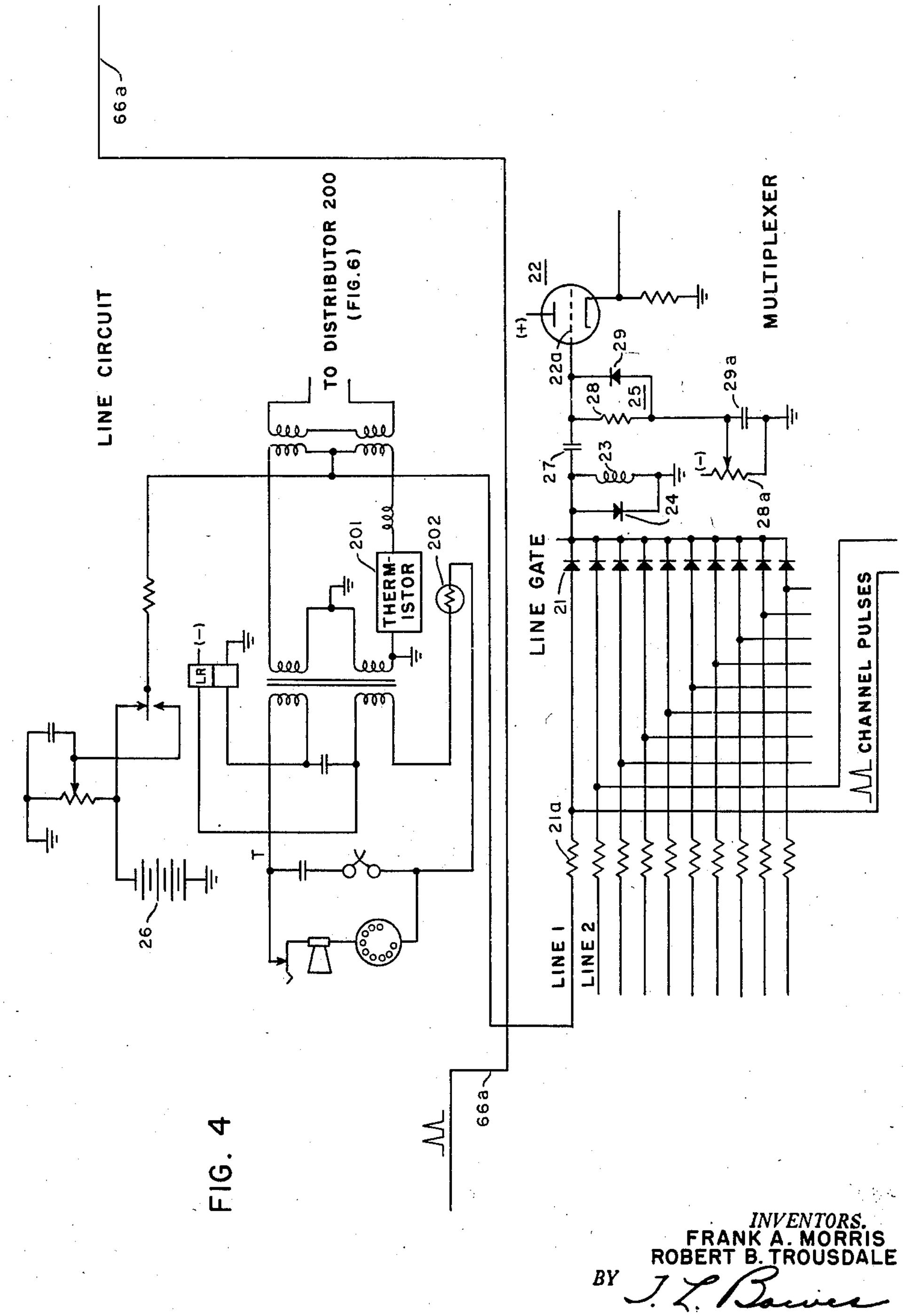
Fig. 4 illustrates a typical line circuit and a suitable multiplexer circuit embodying the principles of the inventon.

There is shown in the lower portion of Fig. 4 one suitable arrangement for intermixing or multiplexing pulses, i. e., sampling the potentials corresponding to various calling lines. The multiplexer shown herein comprises a plurality of unidirectionally conductive devices, such as a rectifier or a crystal, for example, for each line in the line group. Each crystal is normally biased beyond cut off by the negative potential obtained from a suitable source of potential 26 at the back contact of the line relay LR in the line circuit, shown in the upper portion of Fig. 4. When relay LR is energized upon the initiation of a call, the negative bias is reduced by reason of the transfer of the armature of relay LR from direct connection with the negative side of the direct current voltage supply 26 to a less negative potential, as for example, to an intermediate point on a potentiometer 21 which is shown connected between the negative terminal of the direct current source 26 and ground. The potentiometer is adjusted so that the reduced bias is of such a value that audio signals impressed upon the line circuit are barely blocked by the crystals in the absence of channel pulses from the commutator (shown in Fig. 6).

Channel pulses are fed sequentially to the crystals from the sequential pulse generator, shown in Fig. 5, through the commutator, shown in Fig. 6, and are of sufficient amplitude and polarity to overcome completely the bias at the crystals so that the crystal associated with the calling line conducts for short periods corresponding to the duration of the channel pulses. Since the channel pulses and the audio voltage are added at the multiplexer unit associated with the calling line, a form of amplitude modulation results, as indicated in the drawings by Fig. 13.

Referring again to Fig. 4, it is seen that the input or forward side of each crystal 21 is connected through a suitable resistance **21*a* in its associated line circuit whereas the output sides of each crystal or unidirectional device 21 (with respect to its resistance to current flow) are connected together. The common sides of the crystals are connected to the control electrode 22*a* of a suitable electron discharge device 22 as by means of a suitable coupling capacitor 27. The discharge device 22 is arranged as a cathode follower in order to reduce the output impedance sufficiently to avoid pulse distortion from stray capacity in the distributing leads. The output of the cathode follower is connected to the in-gate terminal 50**, Fig. 7, of each finder as is more fully described hereinafter.

In order to minimize cross talk between lines of a subscribers' group there is connected between the common sides of the crystals and ground a suitable inductance 23 having low impedance to audio frequencies carried by adjacent lines. A suitable unilateral device, as a half wave rectifier 24, or crystal diode, for example, is preferably connected across the coil 23 in order to damp out oscillations which may tend to be set up therein.

In order to prevent the control electrode **22*a* of device 22 from swinging more negative than the desired bias level, i. e., in order to establish a reference level at the bias setting, there is provided a suitable clamping circuit 25, which may comprise a suitable resistor 28 connected between the control electrode or input terminal 22*a* of discharge device 22 and a suitable source of potential, as by means of a potentiometer 28*a* connected between a suitable level of negative potential and ground and a unilateral device 29 in shunt with resistance 28. A suitable by-pass capacitor 29*a* may be connected between ground and the low potential junction between resistor 28 and unilateral device 29**.

*Allotter*

In order to allot finders to calls within the chosen calling group there is provided a suitable allotter in the form of a rectangular pulse generator arranged to produce pulses having a predetermined length, preferably of frame duration, i. e., ten times as long as the gate pulses obtained from the sequential pulse generator. The allotter is arranged to have as many output terminals as there are finders and the allotter output pulses are sequentially impressed upon the output leads so that each finder is enabled or made ready for operation for a predetermined period, as a complete frame.

It is believed unnecessary to illustrate details of such an allotter. A "slow" ring circuit, as, for example, one having a repetition rate of 1000 cycles per second, is considered satisfactory and well within the ability and understanding of those skilled in the art. A suitable circuit for this purpose is disclosed in United States Patent 2,512,984 issued to Robert B. Trousdale on June 27, 1950.

Representative allotter pulses are depicted at Fig. 11, N, O, P and Q.

*Finder*

Figs. 7 and 8 of the drawings illustrate one embodiment of a finder circuit. The number of circuits or finders provided for a given number of lines depends upon the traffic conditions and there may be one or more for each line group. Four finders are represented in Figs. 7 and 9. If it be assumed that at least one line is in a calling or "off hook" position, pulses representing that particular line and having time positions representing that particular line appear in the output from the multiplexer, shown in Fig. 4, at all forward in-gate terminals 50, as previously explained.

A number of operations are performed in that part of the system illustrated in Figs. 7 and 8 and referred to herein as a "finder." Each pulse representing the calling line is passed on to the succeeding portions of the system; means responsive to the receipt of pulses representing the calling line is provided for rendering the seizing finder insensitive to the multiplexed channel or signal pulses corresponding to other than the particular line now associated with the finder; means is provided for again enabling or rendering sensitive the in-gate just before the time of receipt of the next pulse representing the calling or seized line and for maintaining the finder in operable condition until such next pulse has been passed; means is provided for transmitting lockout pulses to all other finders for preventing operation or seizure of the other finders by pulses representing the established line-finder link; means is provided for preventing the allotter from further allotting the seizing finder for the duration of the call; timing means is provided for causing the foregoing functions and operations to be performed in the proper sequence; and means is illustrated for preventing the loss of the seizing finder by means of accidental or temporary loss of signal pulses, such as hook switch fumbling, dialing, or flashing, for example.

Each signal or channel pulse passes through the in-gate including electron discharge device 51 and appears in the finder output over conductor 59. Each signal pulse is also utilized to drive the device 51 beyond cut off and also to trigger a timing circuit, the latter being arranged to again enable device 51 just prior to the time corresponding to the next signal pulse representing the seized line.

In the illustrated form of our invention, the timing circuit includes a sawtooth wave generator 79 (Fig. 8), the output pulses of which are peaked and utilized to drive a multivibrator 90, the output of which is utilized as a source of lockout pulses for other finders and to enable the in-gate 51 and auxiliary gate device 52 which permits the introduction of auxiliary or dummy control pulses (Fig. 3). The auxiliary or control pulses produced by the multivibrator 90 are synchronous with the multiplexer output pulses and of the same rate and may be derived from the same source although separate suitable synchronized sources may be used.

The auxiliary gate represented by discharge device 52 may be held open by a resistance-capacitance circuit of suitable time constant. Signal pulses are also used to develop a negative bias for disabling the allotter gate represented by electron discharge device 62 as by suitably charging a capacitor and applying the potential thereof to cut off discharge device 62.

According to the illustrative embodiment of our invention, during any one frame the allotter enables or prepares for operation one finder at a time, the finders being enabled successively for the duration of one complete frame, a frame being one complete cycle of signal pulses representing a single sampling of the several channels in the line group including the calling line. Thus, if there are ten lines, there are ten multiplexer time positions per frame, and each allotter pulse is equal in length to one frame or ten time positions. Referring to Fig. 11, there are shown time diagrams for a four channel system. Each allotter pulse (as Fig. 11N) straddles four time positions (see Fig. 11R wherein the solid vertical lines 110 represent a calling line and the vertical dashed lines 111 represent time positions corresponding to three possible additional calling lines).

Explaining the operation of the finder herein in detail, it is understood from the foregoing that there appears in the output of the multiplexer, i. e., at the in-gate terminal 50, a train of positive-going pulses whenever any line circuit is off-hook, represented by pulses 110 in Fig. 11R for a single line. The multiplexed pulses are applied to the in-gate discharge device 51 of each finder as by means of a suitable coupling capacitor 53 connected to the control electrode 54 of device 51. The device 51 is preferably of the pentode type and is gated by the input pulses.

Discharge device 51 is so biased that the appearance of only signal pulses does not cause it to pass current but it is rendered conductive whenever, in addition, the potential on the suppressor electrode or grid 61 is sufficiently positive, a condition which occurs only in the presence of enabling pulses from the allotter and the absence of lockout pulses from other finders. These conditions obtain whenever the allotter pulse gate 62 and inverter devices 63, 64, and 65, for example, are non-conducting.

The last mentioned inverter devices are utilized to invert positive-going incoming lockout pulses from the other finders in the finder groups into negative-going pulses for cutting off the in-gate 51 at predetermined times, and it is understood that, while only three such inverter devices or lockout pulse gates are shown in the drawings, one is provided for each finder in the finder group.

From the foregoing discussion, it is understood that the allotter pulses, which are negative in sense, serve to render discharge device 62 cut off for a complete frame which thereby results in an increase in potential at the anode of device 62 and consequently at suppressor electrode 61 which unblocks discharge device 51, i. e., raises the threshold, for that frame. Thereafter, for a period equal to the number of other finders, i. e., for a number of frames corresponding to the number of other line finders, the allotter pulse gate amplifier 62 is in a conductive condition and therefore the gated amplifier 51 is non-conductive. It is also understood that the allotter pulse gates corresponding to device 62 in each of the other finders are sequentially rendered conductive for single frames. With this arrangement only one finder is unlocked or enabled at any one time and therefore it is impossible to have erratic performance by reason of two finders trying to lock each other out on a common pulse. The lockout pulses appearing in the common output of lockout gates 63, 64, 65, etc., are also impressed upon the suppressor grid 61 of device 51 and if the lockout pulses are sufficiently negative in sense, discharge device 51 is maintained inoperative during the presence of the lock-out pulses even in the presence of allotter pulses.

In order to render electron discharge device 51 inoperative or nonconducting as soon as the desired pulse is passed on, means is employed utilizing the signal pulse to drive the suppressor grid 61 of discharge device 51 sufficiently negative at the end of the pulse to cut off device 51.

For this purpose, there is shown in the illustrated form of the invention a timing circuit responsive to signal pulses. The frame timer may be any suitable means such as a linear step divider, counting circuit, or multivibrator device, the latter being illustrated herein.

The pulses appearing in the output of inverter 60 are conducted to the control electrode of a suitable mixer stage 75 and the negative-going pulses appearing in the output of mixer stage 75 are applied to the control electrode or grid of limiter 73 through a suitable coupling capacitor. The discharge device 73 should be of sufficiently high gain to be driven well beyond cut off by the negative going pulses received from mixer 75 in order that the inverted positive-going pulses appearing in the anode circuit of discharge device 73 are limited to a constant amplitude. (See Fig. 11W.)

Positive pulses appearing in the output of limiter stage 73 are utilized to trigger an Eccles-Jordan or flip-flop circuit 76 comprising electron discharge devices 77 and 78, the circuit being arranged so that discharge device 77 is normally non-conductive or cut off. The grid or control electrode of discharge device 78 is not only connected to the anode of discharge device 77 through a suitable coupling capacitor and resistor in shunt therewith but also to the input of a suitable saw-tooth wave generator, generally represented by the numeral 79 in Fig. 8, including the discharge device 80 which is preferably of the pentode type. From the foregoing, it is understood that discharge device 80 is normally in a conducting condition inasmuch as discharge device 78 is similarly normally conductive. Appearance of positive-going pulses (Fig. 11U) at the control electrode of discharge device 77 renders discharge device 77 conductive. The resulting decrease in potential at its anode cuts off discharge devices 78 and 80. The potential at the anode 81 of discharge device 80 begins to rise toward the potential of the anode supply, thereby charging a suitable capacitor 82. The potential at capacitor 82 is indicated at Fig. 11X. Means is provided to clamp the pulses appearing in the output of discharge device 80 to a predetermined level beyond cut off as for example, by a suitable unilateral device 84 and a suitable source of negative-potential 84*a*. Circuit values, including the capacity of capacitor 82 and the amplitude or voltage of the potential source 84*a* are so chosen that discharge device 85 connected to the output side of coupling capacitor 88 is rendered conductive at a predetermined time less than one frame duration, for example, a few microseconds less.

The anode circuit of discharge device 85 includes a highly damped resistance-inductance peaking circuit including a suitable inductance 86 shunted by a suitable unilateral device 87 such as a crystal diode for example. The relatively sharp negative-going pulses appearing in the output of discharge device 85 (Fig. 11Y) are impressed upon the control electrode of a suitable inverter stage including a suitable electron discharge device such as a triode 89. The resulting relatively sharp positive-going pulses (Fig. 11Z) are applied to the control electrodes of discharge devices 78 and 80, thereby restoring the Eccles-Jordan circuit 76. Conduction of discharge device 80 at this time discharges capacitor 82 and completes the saw-tooth wave or pulse in the output of discharge device 80 (Fig. 11X).

The output of discharge device 89 is also utilized to trigger pulse generator 90 including a multivibrator circuit comprising electron discharge devices 91 and 92, arranged to produce short rectangularly-shaped pulses of negative sense. These negative-going pulses are inverted in a suitable inverter stage 93 including a suitable discharge device such as a triode 94 and the inverted output reduced to a low impedance in a suitable cathode follower stage 95. Inasmuch as the leading edge of these pulses correspond in time to the retrace of the saw-tooth generator 79, i. e., the time of conduction of discharge device 80, which precedes by a short interval the time of receipt of the next pulses of the calling line, the resulting relatively short rectangular pulses (Fig. 11AA) straddle or overlap the expected time position of the next signal pulse corresponding to the calling line and appearing in the output of the multiplexer (compare pulse 112 in Fig. 11AA with pulse 110 in Fig. 11R). The positive-going pulses appearing in the output of cathode follower stage 95 are also impressed upon the suppressor grid of discharge device 51, as by means of capacitor 115*a*, thereby enabling or preparing discharge device 51 to conduct at the time position of the next signal pulse. The positive-going output pulses from cathode follower stage 95 are also conducted to the other finders to serve as lockout pulses for rendering ineffective the other finders by means of conductor 206 at the time position corresponding to the next signal pulse representing the seized line.

The means for cutting off device 51 shortly after the passage of each pulse is now complete. The "straddle" pulses charge capacitor 115*a*, the charging path being completed through suitable unidirectional means 116. At the trailing edge of each positive pulse from cathode follower 95, the potential at the left hand terminal of capacitor 115*a* follows that at the cathode of device 95 and, therefore, drives the suppressor grid of device 51 so negative that device 51 is cut off. Thus, device 51 is "gated" over a period beginning just before the time position of the line in question and ending just after that time position.

In order to prevent loss of a finder during temporary interruptions, means is provided in the form of an auxiliary gate represented by discharge device 52 to hold the finder seized for a predetermined time after the disappearance of signals at in-gate terminal 50. This function corresponds to the slow release feature of conventional telephone systems.

One output of the pulse generator shown in Fig. 3 is impressed by means of conductor 66*a* upon the auxiliary or dummy gate terminal 66 of each finder and the control electrode 67 of device 52 (see Fig. 11S). Device 52, preferably of the pentode type, is biased to be normally cut off, i. e., cut off in the absence of timing pulses. The pulses appearing in the output of discharge device 52 are utilized to cooperate in the initiation of operation of the previously mentioned timing means. Thus the timing function is controlled by signal pulses, or auxiliary control pulses, or both.

The pulses appearing in the output of discharge device 52 are inverted in a suitable inverter, which may include a suitable electron discharge device such as a triode 68, and thereafter impressed upon the control electrode or grid of a suitable mixer which may be a triode 69 and which is normally cathode biased well beyond cut off.

The inverted signal pulses appearing in the output of discharge device 60 are utilized to build up an unblocking bias for electron discharge device 69. The circuit comprises a cathode follower stage 70, a suitable rectifier 71 such as a diode or crystal, for example, connected between the cathode of discharge device 70 and the grid or control electrode of device 69, and a suitable capacitor 72 connected between the output side of unilateral device or rectifier 71 and ground. Pulses appearing across the cathode resistor in cathode follower stage 70 charge capacitor 72 (see Fig. 11V). The time constant of the foregoing circuit is so chosen that the condenser holds sufficient charge to unblock discharge device 69 during the normal interruptions in the sequence of multiplexer pulses, as during dialing, for example. Thus, there is provided the equivalent of a slow release relay in a conventional mechanical dial exchange which maintains unblocked the control circuit during dialing but releases if the line is deenergized for a period longer than a predetermined time, as a half second, for example.

The unblocking of mixer device 69 permits auxiliary control pulses to pass to limiter stage 73 and thereafter trigger the timing circuit as previously described. From the foregoing description it can be seen that dummy or auxiliary pulses do not flow through the auxliary gate until the latter is unblocked by the first straddle pulse initiated by the timing circuit, but the auxiliary gate continues thereafter to pass auxliary pulses to keep operated the frame timing means until a predetermined time following the end of a call, or cessation of signal pulses because of hang-up or some fault.

Means is provided to disable the allotter gate 62 after the finder has seized the calling line. This is accomplished by applying negative cut off bias to discharge device 62 upon receipt of multiplexer pulses. This bias remains effective until the calling subscriber hangs up. This source of cut off bias may comprise a pair of electron discharge devices such as triodes 97 and 98 connected as a modified cathode-coupled multivibrator, the anode of discharge device 97 being connected to the grid or control electrode of discharge device 98 through a suitable coupling capacitor and to a suitable source of positive potential through resistor 104. The anode of discharge device 98 is shown connected to a suitable source of positive potential through resistor 105. Resistor 104 should have substantially more resistance than resistor 105. The cathodes of both discharge devices 97 and 98 are preferably connected to ground through a common cathode resistor 117 and the grid of discharge device 97 is suitably coupled to the cathode of cathode follower 70. The control electrode of discharge device 98 is also connected to the cathode of discharge device 98 through a suitable resistance 99 and capacitor 100, the capacitor being shunted by two series-connected unilateral devices 101 and 102, such as crystal diodes or rectifiers, for example. The anode of mixer discharge device 75 is connected to a point between unilateral devices 101 and 102 as by means of a suitable coupling capacitor 103. With this arrangement, discharge device 97 is normally cut off because of the cathode voltage resulting from the flow of current through discharge device 98. Signal pulses appearing on the cathode of discharge device 70 cause conduction through discharge device 97 which causes discharge device 98 to be rendered non-conductive. The cathode of discharge device 98 is connected to the suppressor grid of discharge device 62 through resistance 113 and shunt capacitor 114. Due to the difference in resistance between the plate resistors 104 and 105 of devices 97 and 98, the potential across cathode resistor 117 decreases, and acts effectively as a negative pulse which renders non-conductive discharge device 62. As long as the multivibrator 96 remains in the last described condition, the allotter gate is ineffective to pass allotter pulses, i. e., discharge device 62 remains cut off and does not have any effect on the operation of device 51. Ordinarily, a multivibrator of the type shown herein would trip back as soon as the potential at the control electrode of electron discharge device 98 returns to the cut off level by reason of the charging of capacitor **99*a* through the resistor 99. In order to prevent undesired return to the original condition, there is provided negative bias on condenser 100 through the rectifier network. With this arrangement the negative-going pulses appearing in the outputs of mixer stages 69 and 75 are utilized to maintain capacitor 100 at a sufficiently negative potential to render discharge device 98 cut off and discharge device 98 remains cut off until signal pulses disappear for a period of time long enough to permit condenser 100 to discharge sufficiently to permit discharge device 98 to become conductive and to permit the allotter gate tube 62** to reopen.

Means are provided to insure the restoration of the Eccles-Jordan circuit 76 of Fig. 8 to its normally quiescent state with discharge device 77 non-conducting and discharge device 78 conducting. For this purpose there is provided a suitable discharge gap 107, as a neon lamp, for example, one terminal of which is connected to anode 81 of discharge device 80 and the other terminal of which is connected to the control electrode of a suitable electron discharge device 108. The anode of discharge device 108 is connected to the anode of discharge device 78, a source of positive potential, and, through a suitable coupling capacitor, to the control electrode of discharge device 77. As previously explained, when discharge device 80 is cut off, its anode potential begins to rise exponentially. Normally, only a fraction of the rising potential is utilized for the timing function. However, if discharge device 78 fails to receive the trigger pulse from discharge device 89, the anode potential at discharge device 80 continues to rise to a relatively high voltage compared to normal, thereby causing the discharge device 107 to break down and to apply the potential then existing at anode 81 to the control electrode of discharge device 108. Conduction through discharge device 108 pulls down the anode potential at discharge device 108 sufficiently to reduce the anode potential at discharge device 78 to render non-conductive discharge device 77, which in turn operates to render device 78 conductive.

In order to minimize cross-talk between the various finders, the input pulses to each finder are preferably clamped to a predetermined bias level. For example, with the arrangement shown in Fig. 7, input pulses cause control electrode or grid 54 of discharge device 51 to swing only in the positive direction from the bias level. The clamping circuit may comprise a suitable resistor 55 connected to a suitable source of bias potential, and a suitable unilateral device 56 such as a diode or a crystal, for example, the latter being shown connected across resistance 55. The unilateral device is so connected that current is permitted to pass therethrough only when the grid or control electrode 54 is negative with respect to the cathode 57. Thus any shift in the base line of the pulses being received from the multiplexer does not show up as cross-talk because such shifts are prevented from reaching tube 51.

*Connector*

In Fig. 10 there is illustrated a suitable connector and distributor for use in our invention. As noted previously, the connector comprises a demodulator or pulse-to-audio translater 151.

Pulses appearing in the output of the finder are received in a suitable input circuit such as an inverter 160 and these inverted pulses are applied to the control electrode of a suitable discharge device 161 which is normally biased beyond cut off. There is connected across the output side of discharge device 161 a suitable capacitor 162 whose charge follows the amplitude of the signal pulses.

The signal pulse is also passed through a suitable delay circuit 163 which may comprise, for example, a delay line consisting of a plurality of series connected inductances 222 and a plurality of shunt connected capacitors 223 arranged as shown and then applied to capacitor 162 through a suitable electron discharge device 164 which is normally biased beyond cut off.

In operation, discharge device 161 is arranged to be driven to full conduction during each signal pulse applied thereto from inverter 160. Storage capacitor 162 is completely discharged as a result of this heavy flow of current, independent of the exact amplitude of the signal pulse due to the limiting action of discharge device 161. After a time sufficient to allow the signal pulse to subside and conduction to cease through discharge device 161, the signal pulse emerges from the end of the delay circuit 163 and is applied as described previously, to charging device 164. Capacitor 162 is charged by the space current flow through device 164, and reaches a potential proportionate to the amplitude of the modulated signal pulse. This potential persists on the upper terminal of capacitor 162 throughout the remainder of the time position frame, until the said capacitor is discharged by discharge device 161, immediately prior to a recharging to a new signal pulse amplitude.

The potential on the upper terminal of capacitor 162 tends to follow the audio signal in step fashion. These changes in potential are applied to a suitable cathode follower 165, the output of which is conducted to a suitable out-gate 154, which may be a suitable gated amplifier, over conductor 166.

Means is provided for enabling or rendering operable the out-gate 154 in response to the presence of signal or audio voltage. This means comprises means for counting the dial pulses designating the called line and delay means 153 permitting passage of signals through the out-gate at times corresponding to the called line. The output of cathode follower 165 is also impressed upon conductor 167. Since signal pulses may be modulated by either a voltage corresponding to the sound being transmitted or by a voltage corresponding to dial pulses, the latter being substantially constant in amplitude, voltage and frequency conscious means is provided for discriminating between the audio and dial signals. For example, a suitable discriminating device, or integrator 168 may be interposed in conductor 167 whereby only dial pulses are passed.

The integrating unit comprises an electron discharge device such as triode 225, resistors 226 and 227 and capacitor 228. Resistor 226 is connected between the anode of discharge device 225 and the anode of discharge device 98 (Fig. 7) by way of the conductor 59*a*. Resistor 227 is connected between the anode of discharge device 225 and ground through capacitor 228. The junction between resistor 227 and capacitor 228 is connected to the grid of an inverter 169 through a suitable coupling capacitor as shown. Anode 229 of discharge device 225 is normally at a relatively low potential because it is connected directly to the anode of discharge device 98 which is normally conducting and therefore at a relatively low potential. However, it will be recalled from the previous discussion of the finder operation that when the finder seizes a calling line, discharge device 98 is cut off and the supply potential for anode 229 of discharge device 225 suddenly increases.

Pulses from the cathode follower unit 165 of translator 151 are simultaneously applied by means of conductor 167 to the control electrode or grid 230 of discharge device 225, thus saturating device 225 and maintaining the low potential on the anode 229 thereof. Interruptions due to dial pulses are utilized to cut off discharge device 225 whereupon the anode potential rises exponentially, the resistance-capacitance time constant of the integrator circuit 168 being chosen sufficiently large to provide a relatively slow rise of potential. At the end of each dial pulse, the discharge device 225 is again rendered conductive to discharge capacitor 228 with the result that the output of the integrator unit 168 contains sharp negative-going pulses, one for each dial pulse transmitted from the calling end of the line. These pulses are then applied to a dial pulse counting chain 152.

The dial pulse counter 152 connected to the output side of the integrator may be of any type known to the art. For example, a counting chain including an electron discharge device 231 for each digit to be transmitted, e. g., ten, can be provided, each dial pulse triggering on a new tube so that the total current flowing through a common resistor is representative of the digit dialed. The operation of the counting chain will be apparent to those skilled in the art. It is believed sufficient to say at this point that the first dial pulse fires the first tube, the resulting cathode potential unblocks the second tube so the next dial pulse can fire the second tube, and so on.

The output of counting means 152 is impressed upon a suitable delay network which may include a modified form of the so-called "Phantastron" illustrated in Fig. 34 on pages 2–63 of "Principles of Radar," second edition, published by McGraw-Hill Book Company, 1946. It is believed sufficient to point out that the delay network 153 may comprise a "Phantastron" circuit including discharge device 170, shown as of the pentagrid type, and capacitor 171, for providing pulses to enable the diode 172 to trigger the output pulses and determine the duration thereof, and cathode follower 173 for recharging capacitor 171 and providing an output circuit. It will be understood that after a delay determined by the bias applied to grid 174 of discharge device 170 and obtained from the dial pulse counter 152, a pulse is sent to cause out-gate 154 by way of conductor 205 to sample the then-existing audio signal and transmit to the distributor 146 a pulse of amplitude determined by the then-existing amplitude of the audio signal at a time corresponding to the time position of the called line. Means is provided for maintaining the above-mentioned bias throughout the call.

A suitable form of out-gate 154 is illustrated in Fig. 10A. For example, there may be provided an electron discharge device 232 of the pentode type. Conductor 166 may be employed to apply signals received from the translator to the suppressor grid or electrode of discharge device 232. The control grid or electrode of discharge device 232 may be connected to sampling pulse conductor 205 through a suitable coupling capacitor. Those skilled in the art will understand that the appearance of positive-going pulses on conductor 205 effects conduction of discharge device 232 and the transmission to inverter stage 234 of a negative pulse, the amplitude of which being representative of the instantaneous value of the step function appearing on conductor 166.

As indicated in Fig. 10, the outputs of all receiving or out gates are multipled, there being a plurality of connectors available for each group of finders. Accordingly, just as the input to the finder comprised a train of pulses representing different calling lines, the conductor 175 extending to the distributor 146 may have a similar train of pulses impressed thereon and representing one or more calls.

*Distributor*

The distributor may comprise a plurality of normally closed receiving "gates" such as a plurality of electron discharge devices 176, 177, 178 and 179 arranged to be made sequentially responsive or enabled to pass signal pulses, whereby, for example, a pulse on conductor 175 intended for line circuit 180 is impressed upon discharge device 176 during the time discharge device 176 is receptive or gated. Thus, conductor 175 is connected to all control electrodes or signal grids of discharge devices 176 to 179, inclusive. In order to enable the discharge devices, there is provided a source of sequential pulses 181 operating in synchronism with the pulse generator of Fig. 5, and which may be the same generator shown in Fig. 5, in suitable circumstances, instead of a separate source.

With this arrangement, if the dialed line-selecting digit is the numeral 1, signal pulses appear at the grid of discharge device 176 at the same time as a sequential pulse is applied to its suppressor grid over conductor 182; if the dialed digit is 2, signal pulses appear at device 177 coincidentally with a sequential pulse on conductor 183, and so on.

Means is provided for demodulating the pulses appearing in the output circuits of the distributing devices 176, etc. Such means may comprise a shunt-connected capacitor 184 and resistor 185 disposed between the anode of the associated device and ground. The capacitor charges to the amplitude of each pulse and tends to discharge between pulses so that a process of detection results and a close approximation of the audio signal passes on to the line circuit associated therewith.

*Two-way transmission*

The foregoing description is limited to the transmission of sound only from the calling end to the called end of the path set up. In Fig. 15, there is illustrated one embodiment of a two-way system embodying the principles of our invention, the component circuits being indicated in block diagram style.

In Fig. 15, there are shown four lines at each terminal as represented by numerals 186, 187, 188 and 189 at terminal A and numerals 190, 191, 192 and 193 at terminal B. Hybrid coil arrangements, preferably of the type shown in Fig. 4, and explained below are provided as indicated by primed numerals 186′—193′. Terminal A lines are multiplexed at multiplexer 194 and a finder and connector are shown for extending a call through forward in-gate 195 and forward out-gate 196, forward distributor 197 and one of the terminal B hybrid circuits to the called line, as described.

The hybrid circuits referred to above have been devised because the talking paths include electron discharge devices and sufficient amplification is provided to make the total loss through the switching system approximately zero. The hybrid arrangement is provided to eliminate the possibility of oscillation and to reduce distortion due to regeneration. Although a fixed resistance could be employed to balance out the resistive component of most subscriber loops, party lines present a problem because different loop lengths are encountered for each party. In Fig. 4, there is shown means providing automatic compensation for such variance in loop lengths by employing a non-linear resistance element 201 such as a device known by the trade-name "Thermistor" and whose resistance is an inverse function of temperature. Talking battery for the subscriber is fed through the usual coupling coil and a ballast lamp 202 which is non-linear resistance element whose resistance is a direct function of temperature and, in turn, current flow. Ballast lamp 202 becomes hotter on short loops than on long, and the heat of the lamp is used to control the resistance of the device 201. Because of the double inverse nature of the combined functions of ballast lamp and resistor 201, the resistor can be made to assume a resistance which is a direct function of loop length and can, therefore, be made to balance more exactly varying loop resistance.

In each finder there is provided a back-out gate 198 and each connector is equipped with a back-in gate 199. The back gates may be similar to the in-gate or the auxiliary gate shown in Fig. 7 and are arranged to release return signals to a back distributor 200 (which may be combined with the forward distributor 197, if desired) in essentially the same manner as the forward signals are transmitted. The forward in-gate 195 and back-out gate 198 are arranged to be opened simultaneously because a given line in the group 186 to 189 has the same time position in both paths. The finder, therefore, automatically establishes a back path to the calling line from information derived from the forward signal pulse over lead 206 between back out-gate 198 to the lockout lead in the finder (Fig. 7).

Similarly, by arranging forward out-gate 196 and back-in gate 199 to open simultaneously, as by connecting these gates by means of lead 205, dialing into a connector sets up both paths since the return comes from the same point or line as receives the forward signal.

The arrangement of Fig. 15 is suitable for general application but is best suited for systems employing a relatively large number of lines, as 1000 lines, for example. The arrangement of Fig. 16 is useful for small exchanges, up to 100 lines, and is desirable in such cases because it requires only one multiplexer and one distributor. Thus, following the circle diagram of Fig. 16, signals originating from the calling line proceed around the circle through the multiplexer, line finder, connector and distributor to the called line. Signals in the opposite direction pass through the same multiplexer, and then pass through the back portions of the connector and line finder in that order, and then through the common distributor to the calling line circuit. In view of the circuit details shown and described herein, a more detailed discussion is believed unnecessary to enable those skilled in the art to understand the invention.

It may have been noted that signals to be passed have generally been applied to the control electrode or grid of gate tubes. For example, the in-gate device 51 of Fig. 7 receives multiplexed pulses on grid or control electrode 54 and suppressor grid or electrode 61 is connected to a form of gate pulses, as for example, lock-out pulses. In some cases it may be beneficial to reverse this arrangement and impress gate pulses on the control grid and audio signals on the suppressor grid. For example, the alternate arrangement tends to minimize an effect resembling cross-talk due to power supply regulation.

*Modifications*

While the foregoing description has related in detail to the extension of a call in a preferred embodiment of our invention, many modifications within the spirit of the inventive advance in the art may be made. For example, substantial benefit can be obtained by utilizing the principles of our invention only in parts of a complete automatic telephone system. For example, a conventional system embodying step-by-step switches may be employed through and including a conventional connector and then the translator, resampling means and distributor described in connection with Figs. 1 and 10 may be employed to complete the system. Another variation is to employ a pulse multiplex system through the translator and then employ conventional connectors to complete the system.

Furthermore, it is recognized that the foregoing description, employing only finder-connector links, is not conveniently applicable to large exchanges without modification. In view of the foregoing description, it is believed within the ability of those skilled in the art to extend the principles set forth herein to interpose the necessary selectors which may be similar to the translator 151 shown in Fig. 10, for example.

Figs. 17 and 18 illustrate the use of multi-element tube multiplexers.

In Fig. 17 there is illustrated the use of radial beam tubes 120 and 121. Such a tube consists of a number of anodes 122 arranged on the periphery of a circle and which surround a common central cathode 123. In one form, a rotating electrostatic or magnetic field focuses the cathode emission into a radial beam so narrow as to cover only a single anode and sweeps this beam over the several anodes in succession to perform a commutation. Each anode can have an associated grid structure 124 enabling individual control of momentary anode current.

When used as a multiplexing tube, each audio signal may be impressed on an individual grid 124 as by means of incoming lines 125 and the anodes may be tied together to a common conductor 126. When used as a distributing tube, the grids may be tied together and the individual anodes connected to the several audio receiving channels 127. This arrangement as shown in Fig. 17 is intended primarily for amplitude modulation.

Another form of multiplexing circuit is shown in Fig. 18. It is arranged to produce a pulse for each line in off-hook condition. This pulse is completely modulated by low frequency dial pulses and partly modulated by voice frequencies. Talking battery is furnished to a balanced two-wire telephone line through a repeating coil and pulsing relay. Forward audio signals pass unbalanced to a center-tapped repeat coil which is part of the bridge circuit. The compromise balancing network, which may include inductance and variable resistance, also connects to this coil. Upon leaving the bridge circuit, forward signals are impressed on an individual grid in a radial beam multiplexing tube 130 having an anode 131, signal electrodes or grids 132, screen grids 133 and cathode 134. A separate direct current path for the grid return can be traced through an isolating resistance 135 and a "transfer" combination on the pulsing relay LR. The grid is biased to cut off during on-hook periods but changed to essentially class A condition when the relay operates in the off-hook period.

As the radial beam sweeps, anode current momentarily flows when the beam is in a region controlled by the grid of an off-hook line by virtue of the lower bias. If all lines are off-hook, the anode current forms a train of short, separated pulses and the magnitude of each pulse is a function of the grid controlling the particular region. No anode current flows when all lines are idle.

The tube 130 is commutated in a suitable manner as by applying suitable potentials to screen grids 133 from a suitable source 136, which may be a six phase generator, for example.

In Fig. 19 there is illustrated a form of multiplexer in which a pentode type tube, such as the 6AS6, for example, is used for each line. This embodiment is particularly free of cross-talk. In this arrangement, control electrodes 214, 215 and 216 of electron discharge devices 211, 212, 213, respectively, etc., are connected to lines 1, 2, 3, etc., in the manner illustrated in Fig. 4. Control electrodes 217, 218, 219, etc., are connected to the proper conductors from the channel pulse commutator of Fig. 6. The anodes of devices 211, 212, 213, etc., are connected together and to the grid or control electrode 220 of triode inverter 221. The output of inverter 211 may be connected to the control electrode of cathode follower 22 of Fig. 4.

In connection with multiplexer arrangements, it is possible to provide adequate multiplexers without the use of unilateral devices. For example, saturable reactors may be employed to get the necessary control. Further, instead of using negative bias on the line side of the multiplexer units, the same effect can be obtained by providing positive bias on the output side. The important thing is to so arrange the potentials that the input side of the multiplexing unit is relatively negative, i. e., less positive, with respect to the potentials at the output side. Further consideration of this requirement indicates that cut off bias may be discarded and the circuits arranged so that all signals may pass, but only those having a particular characteristic are permitted to have any supervisory or control function, as for example, pulses in excess of a predetermined amplitude, or a shift in phase of pulses, or different pulse widths, to indicate a calling condition and other supervisory and signal functions.

With respect to the allotter, it is pointed out that the principles of our invention are equally applicable to a system in which the allotter is omitted entirely. Under such an arrangement, the available finders are all eligible to become energized or seized by the existence of a calling condition on a line associated with the finders but only the first finder to be energized is permanently seized because the timing arrangements provide lockout for the other finders during the time positions corresponding to such a calling line.

In connection with the finder described herein, means has been provided for allotting successively the finder assigned to each group of lines for single frame of pulses. Obviously, the allotting of the finders may be upon the basis of any desired number of frames. Moreover, the allotting need not be successively by any number of frames but on the basis of use so that each finder remains allotted until assigned to a call. The illustrated arrangement is believed preferable because no timing out means is required to avoid indefinitely paralyzing the system in case of a fault in the alloted finder for example.

The time elapse finder principle has been referred to in detail in this specification. In the embodiment described in detail herein, there was illustrated a timing circuit which was triggered off upon receipt of the first signal pulse from a given line and which remained in phase with the time position of that line for the remainder of the call. There has also been described an arrangement in which additional auxiliary or dummy pulses is provided, in order to furnish triggering pulses during momentary interruptions of signal pulses, as for example during dialing periods. The method disclosed hereinbefore employed self-timing which makes it necessary to maintain a high degree of uniformity of both supply voltage and driving frequency. In Fig. 20, there is disclosed an arrangement for timing the system shown which permits the driving frequency to wander or drift to a slight degree without causing difficulty. Under certain conditions it is also possible to allow wide tolerances of supply voltage. The method herein described and disclosed in Fig. 20 depends upon timing the period between the arrival of signal pulses originating at a a specific line by counting the total number of pulse positions. For instance, if the system is set up on a basis of 100 lines, the arrival of the first signal pulse operates a trigger circuit which opens a gate to allow 100 synchronous pulses to enter for each frame. These pulses may be fed to a counting device such as a ring, step divider, or special counting tube. The counter is adjusted to count up to 100 and upon receiving that number of pulses opens the in-gate of the finder and the process is repeated. In other words, the in-gate is opened each time a full frame has been counted. The point at which the counter begins to count determines which line is accepted.

Referring to Fig. 20, there is disclosed a finder 240 having an in-gate represented by a suitable electron discharge device 52'. Pulses are received from a multiplexer 241 which may be one of those forms shown in either of Figs. 4, 17, 18 or 19, for example. These multiplexer signal pulses appearing at terminal 50 in the finder 240 are applied to the control electrode of in-gate tube 52'. The pulses appearing in the output of tube 52' are used to initiate operation of a suitable trigger circuit 241. The output of trigger circuit 241 is applied to a control electrode or grid 242 of a synchronous pulse gate such as a screen grid tube 243. There is provided a suitable source 244 of synchronous pulses which preferably constitutes the source of channel pulses (Fig. 6) used by the multiplexer and distributor in order that there be a synchronous pulse for each channel or signal pulse. The synchronous pulses are applied to the screen grid 245 of discharge device 243 and the pulses appearing on anode 246 of device 243 are employed to operate a suitable counting chain 247 which may be any well known form. From the foregoing description, it will be understood that the operation of the system is substantially the same as that previously described and an output pulse of counting chain 247 appearing after the duration time of 100 pulses results in the application of a positive-going pulse to in-gate 52' to again enable that tube or discharge device to pass the next signal pulse appearing in the time position of the line which originally seized the finder.

The arrangement disclosed in the preceding paragraphs actually counts all channel positions between the occurrence of a signal pulse and the next signal pulse coming from the same line. In a 100-line system, for example, or one built of 100-line units, there necessarily must be 100 positions to be counted. This arrangement creates two problems. One is to count up to 100 cheaply and the other is to restore the counting device in time to start counting the next frame. Should the frame be built, for example, of 100 one microsecond positions, the restoration must take place in less than 1 microsecond, which presents difficulties if condensers must be discharged in this time. A further modification is to substitute a decimal counting arrangement whereby each frame is divided into ten 10-microsecond periods, each containing ten 1-microsecond periods. For this arrangement, a tens counter can be operated one step for each ten microsecond period and a units counter may be operated on each 1-microsecond pulse so only two ten-step counters are required to register 100 pulses. The problem of restoration time is then solved by operating the two counters in turn. Thus, the first signal pulse may be used to start only the tens counter upon the receipt of the first signal pulse. This operation has the advantage that it takes some time to energize the finder in which such counters are used and the greater length of the tens period allows for a slight delay in this energizing action. Upon reaching the end of the ninth period, the units counter is triggered and the units counter then proceeds to count the 1-microsecond pulses within the tenth period. Since the tens counter is not needed during this tenth counting interval, it may be restored and has a period of 10-microseconds in which to do it. When the units counter has counted off ten 1-microsecond periods, it transmits a signal to open the in-gate of the finder and also to restart the tens counter. The units counter is no longer needed and proceeds to restore, having 90 microseconds in which to do it. In this way, one counter is restoring while the other is working and each is provided with ample time to restore.

Numerous modifications are possible in connection with the various gates described herein. For example, in the illustrated embodiment of our invention, the corresponding in-gates and out-gates are described as being open and closed at the same time. The principles of our invention are not limited to the simultaneous operation of the corresponding in-gates and out-gates. Any arrangement whereby signals are used to open out-gates and signals are allowed to pass through in-gates at suitable times, may be employed.

Whereas we have found it convenient to employ electron discharge devices as gates, our invention is not limited to electron discharge devices or unilateral devices.

Moreover, while there have been illustrated and described separate unidirectional gates for signals passing in different directions, it is entirely possible to impress both outgoing and returning signals on the input side of a single gate and separate the signals going in the different directions at the output as by means of amplitude, pulse width, or time position selection, for example.

While we have shown and described a particular embodiment of our invention, it will be obvious to those skilled in the art that changes and modifications may be made without departing from our invention in its broader aspects. We, therefore, aim in the appended claims to cover all such changes and modifications as fall within the true spirit and scope of our invention.

What we claim is:

1. In an automatic telephone system, a plurality of lines having individually assigned thereto different time positions in repetitive time position frames, means for developing signal pulses in the time position assigned to a calling one of said lines in response to initiation of a call thereon, means for developing auxiliary pulses in each of said time positions, means for developing allotter pulses of substantially greater duration than one of said time positions, gating means jointly controlled by said signal pulses and said allotter pulses for developing control pulses in the time position assigned to the calling line, and time delay means controlled by either said control pulses or auxiliary pulses in the time position of the calling line for developing gate pulses in the time position assigned to the calling line for thereafter enabling said gating means only during the time position of the calling line.

2. In an automatic telephone system, a plurality of lines having individually assigned thereto different time positions in repetitive time position frames, means for developing signal pulses in the time position assigned to a calling one of said lines in response to initiation of a call thereon, means for developing auxiliary pulses in each of said time positions, means for developing allotter pulses of substantially greater duration than one of said time positions, gating means jointly controlled by said signal pulses and said allotter pulses for developing control pulses in the time position assigned to the calling line, time delay means controlled by either said control pulses or auxiliary pulses in the time position of the calling line for developing gate pulses in the time position assigned to the calling line, and means for applying said gate pulses to said gating means to prevent said gating means from thereafter developing control pulses in time positions other than the time position assigned to the calling line.

3. In an automatic telephone system, a plurality of lines having individually assigned thereto different time positions in repetitive time position frames, means for developing signal pulses in the time position assigned to a calling one of said lines in response to initiation of a call thereon, means for developing auxiliary pulses in each of said time positions, means for developing allotter pulses of substantially greater duration than one of said time positions, gating means jointly controlled by said signal pulses and said allotter pulses for developing control pulses in the time position assigned to the calling line, means responsive to control pulses developed by said gating means for producing a control potential, time delay means responsive to control pulses developed by said gating means for developing gate pulses in the time position assigned to the calling line, and means jointly controlled by said control potential and said auxiliary pulses for also controlling said time delay means to develop gate pulses in the time position of the calling line, whereby said gate pulses are continuously developed in the time position assigned to the calling line despite momentary disappearance of said signal pulses.

4. In an automatic telephone system, a plurality of lines having individually assigned thereto different time positions in repetitive time position frames, means for developing signal pulses in the time position assigned to a calling one of said lines in response to initiation of a call thereon, means for developing auxiliary pulses in each of said time positions, means for developing allotter pulses of substantially greater duration than one of said time positions, gating means jointly controlled by said signal pulses and said allotter pulses for developing control pulses in the time position assigned to the calling line, means responsive to control pulses developed by said gating means for producing a control potential, time delay means responsive to control pulses developed by said gating means for developing gate pulses in the time position assigned to the calling line, auxiliary gating means controlled by said gate pulses for selecting that one of said auxiliary pulses which occurs in the time position assigned to the calling line, and means jointly controlled by said control potential and said selected auxiliary pulse for also controlling said time delay means to develop gate pulses in the time position of the calling line, whereby said gate pulses are continuously developed in the time position assigned to the calling line despite momentary disappearance of said signal pulses.

5. In an automatic telephone system, a plurality of lines having individually assigned thereto different time positions in repetitive time position frames, means for developing signal pulses in the time position assigned to a calling one of said lines in response to initiation of a call thereon, means for developing auxiliary pulses in each of said time positions, means for developing allotter pulses of substantially greater duration than one of said time positions, first gating means controlled by said allotter pulses to gate signal pulses therethrough which occur during said allotter pulses, time delay means controlled by the signal pulses transmitted through said first gating means for developing gate pulses in the time position assigned to the calling line, means for impressing said gate pulses on said first gating means to permit said first gating means to pass signal pulses only in the time position assigned to the calling line, means responsive to signal pulses transmitted through said first gating means for developing a control potential, means jointly controlled by said control potential and said auxiliary pulses for also controlling said time delay means to develop gate pulses in the time position assigned to the calling line, and means responsive to signal pulses transmitted through said first gating means for discontinuing control of said first gating means by said allotter pulses, whereby said first gating means is enabled by said gate pulses to pass a signal pulse in the time position of the calling line during each of said pulse frames.

6. In an automatic telephone system, a plurality of lines having individually assigned thereto different time positions in repetitive time position frames, means for developing signal pulses in the time position assigned to a calling one of said lines in response to initiation of a call thereon, means for developing auxiliary pulses in each of said time positions, means for developing allotter pulses of substantially greater duration than one of said time positions, first gating means controlled by said allotter pulses to gate signal pulses therethrough which occur during said allotter pulses, time delay means controlled by the signal pulses transmitted through said first gating means for developing gate pulses in the time position assigned to the calling line, means for impressing said gate pulses on said first gating means to permit said first gating means to pass signal pulses only in the time position assigned to the calling line, means responsive to signal pulses transmitted through said first gating means for developing a control potential, auxiliary gating means controlled by said gate pulses for selecting that one of said auxiliary pulses which occurs in the time position assigned to the calling line, means jointly controlled by said control potential and said selected auxiliary pulses for also controlling said time delay means to develop gate pulses in the time position of the calling line, and means responsive to signal pulses transmitted through said first gating means for discontinuing control of said first gating means by said allotter pulses, whereby said first gating means is enabled by said gate pulses to pass a signal pulse in the time position of the calling line during each of said pulse frames.

7. In an automatic telephone system, a plurality of lines having individually assigned thereto different time positions in repetitive time position frames, means for developing signal pulses in the time position assigned to a calling one of said lines in response to initiation of a call thereon, means for developing auxiliary pulses in each of said time positions, means for developing allotter pulses of substantially greater duration than one of said time positions, gating means jointly controlled by said signal pulses and said allotter pulses for developing control pulses in the time position assigned to the calling line, means responsive to control pulses developed by said gating means for producing a control potential, time delay means responsive to control pulses developed by said gating means for developing gate pulses in the time position assigned to the calling line, means jointly controlled by said control potential and said auxiliary pulses for also controlling said time delay means to develop gate pulses in the time position of the calling line, whereby said gate pulses are continuously developed in the time position assigned to the calling line despite momentary disappearance of said signal pulses, and means responsive to prolonged absence of signal pulses in the time position assigned to the calling line for removing said control potential, thereby to cause said time delay means to cease developing gate pulses in the time position assigned to the calling line.

8. In an automatic telephone system, a source of two sets of pulses, one displaceable in phase relationship with respect to the other, means utilizing one set of pulses for providing sequentially occurring pulses at a plurality of terminals, means utilizing the other set of pulses for providing a train of multiplexed pulses corresponding to various calling lines, means for distributing gate pulses from the said terminals to enable said multiplexing means, a plurality of finder means, means for allotting one of said finders to seize a calling line, means for passing multiplexed pulses corresponding to said seized calling line through said finder, means for rendering said finder inoperative to multiplexed pulses corresponding to other lines, each of said finders having an in-gate, means for enabling said in-gate at time periods corresponding to the receipt of pulses representing the seized line, means utilizing said pulses for transmitting lockout pulses to prevent the operation of the other finders in response to signals from the seized lines, means for disabling the allotting means with respect to the seized finder for the duration of the call, and means for preventing the loss of a seized finder by accidental or temporary absence of signal pulses.

9. In a telephone system of the multiplex type wherein a plurality of messages or sound signals are multiplexed by successive samplings of the signal voltages representing different lines whereby a train of single pulses is developed, corresponding pulses within each frame representing a particular line; a group of calling lines; a plurality of finding means assigned to said group of lines; means for successively allotting each of said finding means for seizing to a calling line; said finding means comprising an electron discharge device, means for impressing multiplexed pulses on said device, said device being normally biased beyond cutoff when only multiplexed pulses are present; means including said allotting means for raising the threshold of said device sufficiently to enable said device to be made conductive in the presence of pulses; means for rendering said device non-conductive after seizure; and means for thereafter raising the threshold during the time period within each frame corresponding to the seizing line; said last-mentioned means comprising a source of auxiliary pulses having time synchronism with said multiplexed pulses, a normally non-conductive auxiliary gate, a timing circuit, means utilizing said signal pulses, auxiliary pulses, or both, for triggering said timing circuit, said timing circuit producing a control pulse at such time and of such duration as to straddle the time position of the next signal pulse of the seized line, means utilizing said control pulses to enable said discharge device at such times, and means utilizing control pulses from the remaining finding means for preventing operation of said discharge device during time positions corresponding to other of said calling lines.

10. In a telephone system of the multiplex type wherein a plurality of messages or sound signals are multiplexed by successive samplings of the signal voltages representing different lines whereby trains of successive single pulses are developed, corresponding pulses within each frame representing a particular line; a group of calling lines; a plurality of finding means assigned to said group of lines; means for successively allotting each of said finding means for seizing and extending said calling line; said finding means comprising a normally cut-off signal gate, means for impressing multiplexed pulses on said signal gate, the amplitude of said pulses alone being insufficient to render conductive said gate; means including said allotting means for raising the threshold of said signal gate sufficiently to enable said signal gate to be made conductive in the presence of multiplexed pulses; means for rendering said signal gate non-conductive after the passage of one pulse; and means for thereafter raising the threshold of said signal gate during that time period within each frame corresponding to the seizing pulses passing through said signal gate, said last-mentioned means comprising a source of auxiliary pulses having time synchronism with said multiplexed pulses, a normally non-conductive auxiliary gate, a timing circuit, means utilizing said auxiliary pulses for triggering said timing circuit, said timing circuit producing a control pulse at such time and of such duration as to straddle the time position of the next signal pulse of the seized line, and means utilizing said control pulses to enable said signal gate at such times.

11. In a telephone system of the multiplex type wherein a plurality of messages or sound signals are multiplexed by successive samplings of the signal voltages representing different lines whereby a train of single pulses is developed, corresponding pulses within each frame representing a particular line; a group of calling lines; a plurality of finding means assigned to said group of lines; means for successively allotting each of said finding means for seizing and extending said calling line; said finding means comprising a signal gate, means for impressing multiplexed pulses on said signal gate, said signal gate being normally biased beyond cutoff when only signals are present; means including said allotting means for raising the threshold of said signal gate sufficiently to enable said signal gate to be made conductive in the presence of multiplexed pulses; means for rendering said signal gate non-conductive after the passage of one pulse; and means for thereafter raising the threshold of said signal gate during the time period within each frame corresponding to the signal first passing through said signal gate; said last-mentioned means comprising a source of auxiliary pulses having time synchronism with said multiplexed pulses, a normally non-conductive auxiliary gate, a timing circuit, means utilizing said auxiliary pulses for triggering said timing circuit, said timing circuit producing a control pulse at such time and of such duration as to straddle the time position of the next signal pulse of the seized line, means utilizing said control pulses to enable said signal gate at such times, and means utilizing either auxiliary pulses or signal pulses for triggering said timing circuit.

12. In a telephone system of the multiplex type wherein a plurality of messages or sound signals are multiplexed by successive samplings of the signal voltages representing different lines whereby a train of single pulses is developed, corresponding pulses within each frame representing a particular line; a group of calling lines; a plurality of finding means assigned to said group of lines; means for successively allotting each of said finding means for seizing and extending said calling line; said finding means comprising a signal gate, means for impressing multiplexed pulses on said signal gate, said signal gate being normally biased beyond cutoff when only multiplexed pulses are present; means including said allotting means for raising the threshold of said signal gate sufficiently to enable said signal gate to be made conductive in the presence of multiplexed pulses; means for rendering said signal gate non-conductive after the passage of one pulse; and means for thereafter raising the threshold of said signal gate during the time period within each frame corresponding to the signal first passing through said signal amplifier, said last-mentioned means comprising a source of auxiliary pulses having time synchronism with said multiplexed pulses, a normally non-conductive auxiliary gate, a timing circuit, means utilizing said auxiliary pulses for triggering said timing circuit, said timing circuit producing a control pulse at such time and of such duration as to straddle the time position of the next signal pulse of the seized line, means utilizing said control pulses to enable said signal gate at such time, and means utilizing said control pulses for locking out the other finding means for preventing operation of the signal amplifiers associated with said other finding means.

13. In a telephone system of the multiplex type wherein a plurality of messages or sound signals are multiplexed by successive samplings of the signal voltages representing different lines whereby a train of single pulses is developed, corresponding pulses within each frame representing a particular line; a group of calling lines; a plurality of finding means assigned to said group of lines; means for successively allotting each of said finding means for seizing and extending said calling lines; said finding means comprising a signal gate, means for impressing multiplexed pulses on said signal gate, said signal gate being normally biased beyond cutoff when only signals are present; means including said allotting means for raising the threshold of said signal gate sufficiently to enable said signal gate to be made conductive in the presence of multiplexed pulses; means for rendering said signal gate non-conductive after the passage of one pulse; means for thereafter raising the threshold of said signal gate during the time period within each frame corresponding to the signal first passing through said signal gate; said last-mentioned means comprising a source of auxiliary pulses having time synchronism with said multiplexed pulses, a normally non-conductive auxiliary gate, a timing circuit, means utilizing said auxiliary pulses for triggering said timing circuit, said timing circuit producing a control pulse at such time and of such duration as to straddle the time position of the next signal pulse of the seized line, and means utilizing said control pulse is to enable said signal gate and said auxiliary gate at such times.

14. In a telephone system of the multiplex type wherein a plurality of messages or sound signals are multiplexed by successive samplings of the signal voltages representing different lines whereby a train of single pulses is developed, corresponding pulses within each frame representing a particular line; a group of calling lines; a plurality of finding means assigned to said group of lines; means for successively allotting each of said finding means for seizing and extending said calling line; said finding means comprising a signal gate, means for impressing multiplexed pulses on said signal gate, said signal gate being normally biased beyond cutoff when only signals are present; means including said allotting means for raising the threshold of said signal gate sufficiently to enable said signal gate to be made conductive in the presence of multiplexed pulses; means for rendering said signal gate non-conductive after the passage of one pulse; means for thereafter raising the threshold of said signal gate during the time period within each frame corresponding to the pulse first passing through said signal gate, said last-mentioned means comprising a source of auxiliary pulses having time synchronism with said multiplexed pulses, a normally non-conductive auxiliary gate, a timing circuit, means utilizing said auxiliary pulses for triggering said timing circuit, said timing circuit producing a control pulse at such time and of such duration as to straddle the time position of the next signal pulse of the seized line, means utilizing said control pulses to enable said signal gate at such times; and means for maintaining said auxiliary gate enabled for a predetermined time following cessation of multiplexed pulses whereby seizure is maintained over temporary loss of multiplexed pulses but said finding means is made available to another calling line a predetermined time after said calling party hangs up.

References Cited in the file of this patent

UNITED STATES PATENTS

| | | |
|---|---|---|
| 2,490,833 | Ransom | Dec. 13, 1949 |
| 2,492,180 | Ransom | Dec. 27, 1949 |